(12) United States Patent
Hoshizaki et al.

(10) Patent No.: US 12,076,722 B2
(45) Date of Patent: Sep. 3, 2024

(54) SYSTEMS AND METHODS FOR PROVIDING FLUIDIC ACCESS TO A FLOW CELL

(71) Applicant: LIFE TECHNOLOGIES CORPORATION, Carlsbad, CA (US)

(72) Inventors: Jon Hoshizaki, Cupertino, CA (US); Patrick Leung, San Bruno, CA (US); David Marran, Durham, CT (US); Mark Reed, Menlo Park, CA (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 18/107,887

(22) Filed: Feb. 9, 2023

(65) Prior Publication Data

US 2023/0226548 A1    Jul. 20, 2023

Related U.S. Application Data

(62) Division of application No. 16/994,289, filed on Aug. 14, 2020, now Pat. No. 11,590,499.

(Continued)

(51) Int. Cl.
| | |
|---|---|
| *B01L 3/00* | (2006.01) |
| *A61J 1/20* | (2006.01) |
| *B01F 23/00* | (2022.01) |
| *B01F 23/41* | (2022.01) |
| *B01F 101/23* | (2022.01) |
| *B23Q 17/24* | (2006.01) |
| *C12M 1/34* | (2006.01) |
| *C12Q 1/04* | (2006.01) |
| *C12Q 1/18* | (2006.01) |

(Continued)

(52) U.S. Cl.
CPC ....... *B01L 3/502738* (2013.01); *A61J 1/2058* (2015.05); *B01L 3/502715* (2013.01); *B01L 3/50273* (2013.01); *B01L 2300/0816* (2013.01)

(58) Field of Classification Search
CPC ......... B01L 3/502738; B01L 3/502715; B01L 3/50273; B01L 2300/0816; B01L 2200/026; B01L 2200/0668; B01L 2300/0645; B01L 2300/0663; B01L 2300/0829; B01L 3/502753; B01L 3/502761; G01N 35/1095; C12Q 1/6874
See application file for complete search history.

(56) References Cited

U.S. PATENT DOCUMENTS

| | | |
|---|---|---|
| 9,243,085 B2 | 1/2016 | Fonnum et al. |
| 9,868,826 B2 | 1/2018 | Fonnum et al. |
| (Continued) | | |

FOREIGN PATENT DOCUMENTS

| | | |
|---|---|---|
| WO | WO-2012058096 A1 | 5/2012 |
| WO | WO-2019094524 A1 | 5/2019 |

OTHER PUBLICATIONS

PCT/US2020/046502, Search Report and Written Opinion, Nov. 11, 2020, 13 pages.

*Primary Examiner* — Jennifer Wecker
*Assistant Examiner* — Oyeleye Alexander Alabi

(57) ABSTRACT

A fluidic coupler to engage a plurality of flow cells of a sensor device includes a body and a plurality of fluidics interfaces formed in the body. Each fluidic interface of the plurality of fluidics interfaces includes an opening, a first port in fluid communication with the opening, a second port, and a third port in fluidic communication with the second port.

20 Claims, 13 Drawing Sheets

Related U.S. Application Data

(60) Provisional application No. 62/890,009, filed on Aug. 21, 2019.

(51) Int. Cl.
| | |
|---|---|
| *C12Q 1/686* | (2018.01) |
| *G01N 21/3577* | (2014.01) |
| *G01N 21/359* | (2014.01) |
| *G01N 21/39* | (2006.01) |
| *G01N 21/45* | (2006.01) |
| *G01N 21/64* | (2006.01) |
| *G01N 30/12* | (2006.01) |
| *G01N 30/68* | (2006.01) |
| *G01N 30/70* | (2006.01) |
| *G01N 30/72* | (2006.01) |
| *G01N 30/88* | (2006.01) |
| *G01N 33/00* | (2006.01) |
| *G01N 33/18* | (2006.01) |
| *G01N 33/50* | (2006.01) |
| *G01N 33/68* | (2006.01) |

(56) References Cited

U.S. PATENT DOCUMENTS

| | | | |
|---|---|---|---|
| 2010/0319695 A1* | 12/2010 | Freed | F16L 37/47 |
| | | | 128/203.16 |
| 2012/0143531 A1* | 6/2012 | Davey | G01N 33/48785 |
| | | | 73/40.5 R |
| 2012/0167672 A1 | 7/2012 | Miller | |
| 2013/0210682 A1* | 8/2013 | Eltoukhy | C12Q 1/6874 |
| | | | 506/38 |
| 2016/0263572 A1 | 9/2016 | Gaige et al. | |
| 2019/0001329 A1* | 1/2019 | Huehner | G01N 27/44791 |

* cited by examiner

SYSTEMS AND METHODS FOR PROVIDING FLUIDIC ACCESS TO A FLOW CELL

CROSS-REFERENCE TO RELATED APPLICATION(S)

This application is a divisional application of U.S. patent application Ser. No. 16/994,289, filed Aug. 14, 2020, which claims benefit of U.S. Provisional Application No. 62/890,009, filed Aug. 21, 2019, each of which is incorporated herein by reference in its entirety.

FIELD OF THE DISCLOSURE

The present disclosure relates generally to systems and methods for providing fluidic access to a flow cell.

BACKGROUND

Increasingly, biological and medical research is turning to nucleic acid sequencing for enhancing biological studies and medicine. For example, biologists and zoologists are turning to sequencing to study the migration of animals, the evolution of species, and the origins of traits. The medical community is using sequencing for studying the origins of disease, sensitivity to medicines, and the origins of infection. As such, sequencing has wide applicability in practically every aspect of biology, therapeutics, diagnostics, forensics and research.

Nevertheless, the use of sequencing can be limited by assay availability, sequencing run time, preparation time, and cost. Additionally, quality sequencing has historically been an expensive process, thus limiting its practice.

As such, improved sequencing systems incorporating automation would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a fluidic coupler can be applied to a mechanical assembly. The mechanical assembly aids in coupling the fluidic coupler with a sensor device having a flow cell. The fluidic coupler includes openings in communication with a set of ports that can be pressed into fluidic communication with inlets of the flow cell of the sensor device. In addition, the fluidic coupler can include a second set of ports that provide fluidic communication with outlets of the flow cell of the sensor device. The mechanical assembly can press the fluidic coupler against the sensor device providing for the fluidic communication between the inlet and outlet of the sensor device. The mechanical assembly can include a fluidic manifold that connects to a third set of ports of the fluidic coupler. The third set of ports of the fluid coupler are in fluid communication with the second set of ports of the fluidic coupler that are in communication with the outlets of the sensor device. The fluidic coupler can include reference holes and interact with guide rods of the mechanical assembly to assist with positioning the fluidic coupler. The guide rods can engage the fluidic coupler as the fluidic coupler is pressed against the sensor device and can disengage from the fluidic coupler, allowing the fluidic coupler to be removed from the mechanical assembly. Further, the mechanical assembly can include a mechanical drive, such as a screw drive, and a spring mechanism that applies a desired force against the fluidic coupler and sensor device to enhance the fluidic connection between the fluidic coupler and the sensor device.

In use, a sensor device can be inserted into a slide mechanism, for example, to hold the sensor device in a vertical orientation. The fluidic coupler can be inserted into a mechanical assembly. The sensor device be moved into position relative to the fluidic coupler. The mechanical assembly can press the fluidic coupler into the sensor device. Guide rods of the mechanical assembly can engage reference holes of the fluidic coupler, and a spring mechanism can apply a desired force on the fluidic coupler to provide fluidic communication between the fluidic coupler and the sensor device. A fluid composition can be pipetted into the openings of the fluidic coupler and into inlets of the flow cells of the sensor device via a first set of ports of the fluidic coupler. The mechanical assembly can withdraw the guide rods from the reference holes of the fluidic coupler and can release the fluidic coupler to be removed from the mechanical assembly. The sensor device can be moved to further stations using the slide mechanism.

Figure 1:
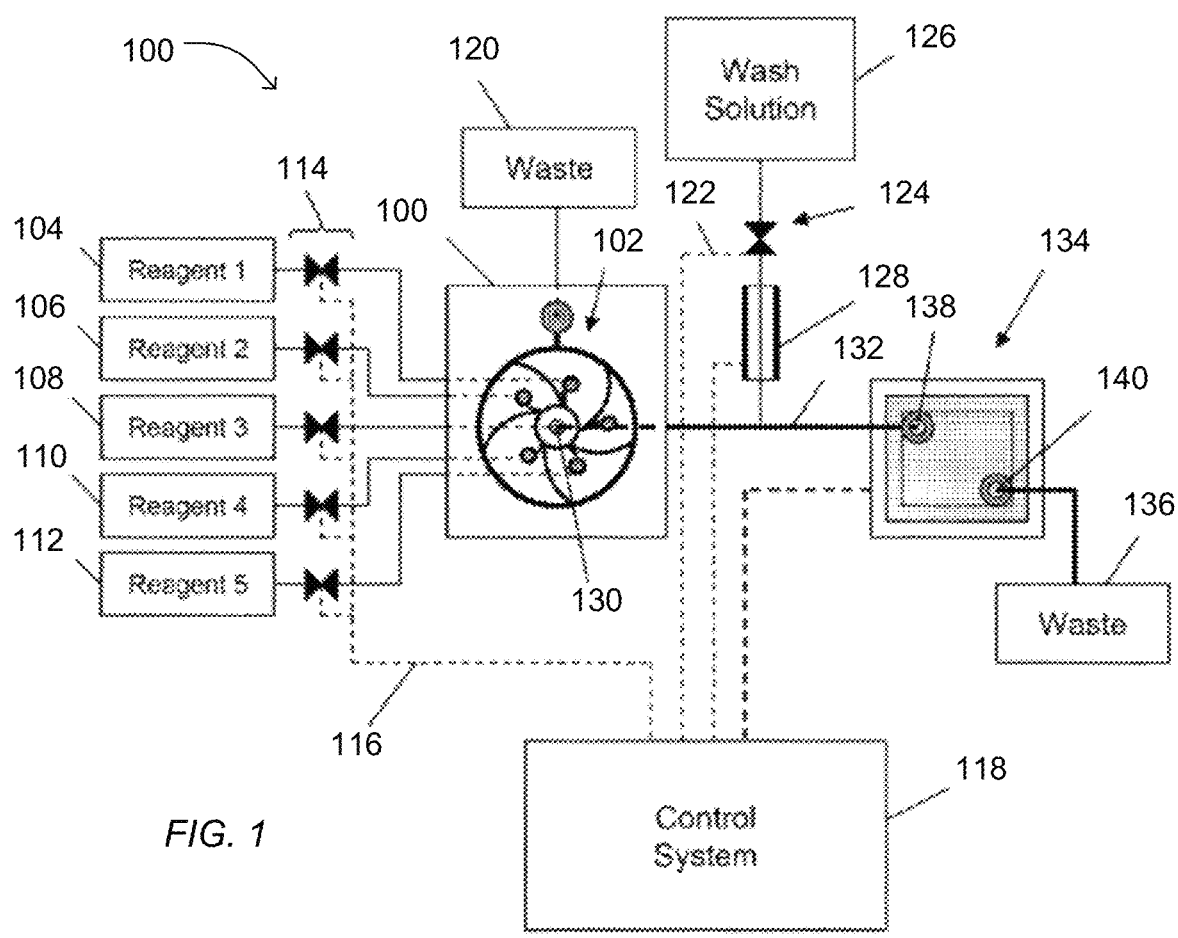
FIG. 1 includes an illustration of an example sequencing system.

Embodiments of the fluidic coupler and mechanical assembly find particular use in sequencing instruments. For example, in FIG. 1, a system 100 containing fluidics circuit 102 is connected by inlets to at least two reagent reservoirs (104, 106, 108, 110, or 112), to waste reservoir 120, and to biosensor 134 by fluid pathway 132 that connects fluidics node 130 to inlet 138 of biosensor 134 for fluidic communication. Reagents from reservoirs (104, 106, 108, 110, or 112) can be driven to fluidic circuit 102 by a variety of methods including pressure, pumps, such as syringe pumps, gravity feed, and the like, and are selected by control of valves 114. Reagents from the fluidics circuit 102 can be driven through the valves 114 receiving signals from control system 118 to waste container 120. Reagents from the fluidics circuit 102 can also be driven through the biosensor 134 to the waste container 136. The control system 118 includes controllers for valves, which generate signals for opening and closing via electrical connection 116.

The control system 118 also includes controllers for other components of the system, such as wash solution valve 124 connected thereto by electrical connection 122, and reference electrode 128. Control system 118 can also include control and data acquisition functions for biosensor 134. In one mode of operation, fluidic circuit 102 delivers a sequence of selected reagents 1, 2, 3, 4, or 5 to biosensor 134 under programmed control of control system 118, such that in between selected reagent flows, fluidics circuit 102 is primed and washed, and biosensor 134 is washed. Fluids entering biosensor 134 exit through outlet 140 and are deposited in waste container 136 via control of pinch valve regulator 144. The valve 144 is in fluidic communication with the sensor fluid output 140 of the biosensor 134.

The biosensor including a dielectric layer defining a well and exposing a sensor pad finds particular use in detecting chemical reactions and byproducts, such as detecting the release of hydrogen ions in response to nucleotide incorporation, useful in genetic sequencing, among other applications. In a particular embodiment, a sequencing system includes a flow cell in which a sensory array is disposed, includes communication circuitry in electronic communication with the sensory array, and includes containers and fluid controls in fluidic communication with the flow cell.

Figure 2:
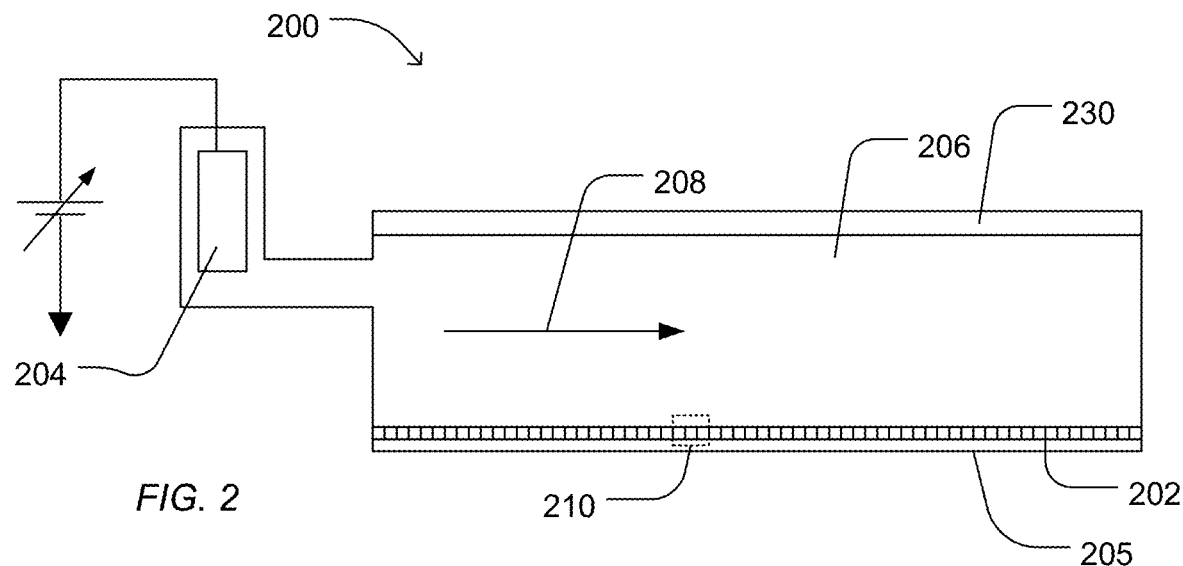
FIG. 2 includes an illustration of an example system including a sensor array.

In an example, FIG. 2 illustrates an expanded and cross-sectional view of a flow cell 200 and illustrates a portion of a flow chamber 206. A reagent flow 208 flows across a surface of a well array 202, in which the reagent flow 208 flows over the open ends of wells of the well array 202. The well array 202 and a sensor array 205 together may form an integrated unit forming a lower wall (or floor) of flow cell 200. A reference electrode 204 may be fluidly coupled to flow chamber 206. Further, a flow cell cover 230 encapsulates flow chamber 206 to contain reagent flow 208 within a confined region.

Figure 3:
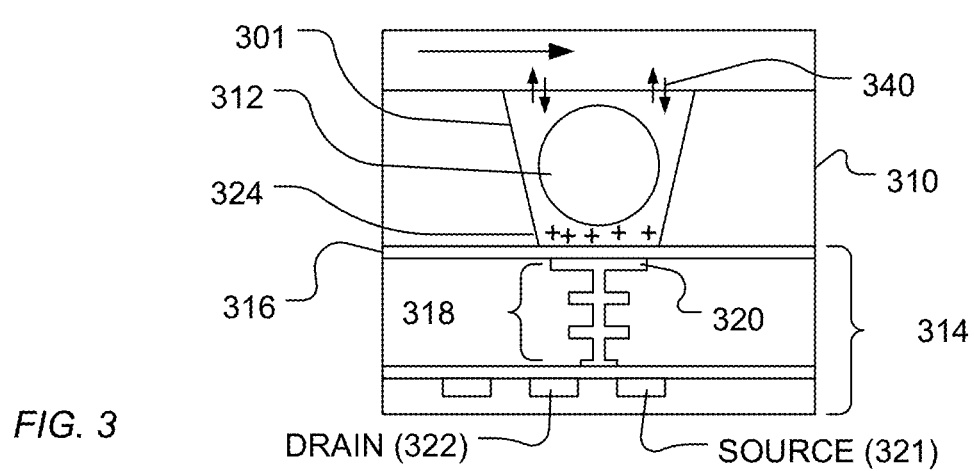
FIG. 3 includes an illustration of an example sensor and associated well.

FIG. 3 illustrates an expanded view of a well 301 and a sensor 314, as illustrated at 210 of FIG. 2. The volume, shape, aspect ratio (such as base width-to-well depth ratio), and other dimensional characteristics of the wells may be selected based on the nature of the reaction taking place, as well as the reagents, byproducts, or labeling techniques (if any) that are employed. The sensor 314 can be a chemical field-effect transistor (chemFET), more specifically an ion-sensitive FET (ISFET), with a floating gate 318 having a sensor plate 320 optionally separated from the well interior by a material layer 316. The sensor 314 can be responsive to (and generate an output signal related to) the amount of a charge 324 present on the material layer 316 opposite the sensor plate 320. The material layer 316 can be a ceramic layer, such as an oxide of zirconium, hafnium, tantalum, aluminum, or titanium, among others, or a nitride of titanium. Alternatively, the material layer 316 can be formed of a metal, such as titanium, tungsten, gold, silver, platinum, aluminum, copper, or a combination thereof. In an example, the material layer 316 can have a thickness in a range of 5 nm to 100 nm, such as a range of 10 nm to 70 nm, a range of 15 nm to 65 nm, or even a range of 20 nm to 50 nm.

While the material layer 316 is illustrated as extending beyond the bounds of the illustrated FET component, the material layer 316 can extend along the bottom of the well 301 and optionally along the walls of the well 301. The sensor 314 can be responsive to (and generate an output signal related to) the amount of a charge 324 present on the material layer 316 opposite the sensor plate 320. Changes in the charge 324 can cause changes in a current between a source 321 and a drain 322 of the chemFET. In turn, the chemFET can be used directly to provide a current-based output signal or indirectly with additional circuitry to provide a voltage-based output signal. Reactants, wash solutions, and other reagents may move in and out of the wells by a diffusion mechanism 340.

The well 301 can be defined by a wall structure, which can be formed of one or more layers of material. In an example, the wall structure can have a thickness extending from the lower surface to the upper surface of the well in a range of 0.01 micrometers to 10 micrometers, such as a range of 0.05 micrometers to 10 micrometers, a range of 0.1 micrometers to 10 micrometers, a range of 0.3 micrometers to 10 micrometers, or a range of 0.5 micrometers to 6 micrometers. In particular, the thickness can be in a range of 0.01 micrometers to 1 micrometer, such as a range of 0.05 micrometers to 0.5 micrometers, or a range of 0.05 micrometers to 0.3 micrometers. The wells 301 of array 202 can have a characteristic diameter, defined as the square root of 4 times the cross-sectional area (A) divided by Pi (e.g., sqrt($4*A/\pi$)), of not greater than 5 micrometers, such as not greater than 3.5 micrometers, not greater than 2.0 micrometers, not greater than 1.6 micrometers, not greater than 1.0 micrometers, not greater than 0.8 micrometers or even not greater than 0.6 micrometers. In an example, the wells 301 can have a characteristic diameter of at least 0.01 micrometers. In a further example, the well 301 can define a volume in a range of 0.05 fL to 10 pL, such as a volume in a range of 0.05 fL to 1 pL, a range of 0.05 fL to 100 fL, a range of 0.05 fL to 10 fL, or even a range of 0.1 fL to 5 fL.

In an embodiment, reactions carried out in the well 301 can be analytical reactions to identify or determine characteristics or properties of an analyte of interest. Such reactions can generate directly or indirectly byproducts that affect the amount of charge adjacent to the sensor plate 320. If such byproducts are produced in small amounts or rapidly decay or react with other constituents, then multiple copies of the same analyte may be analyzed in the well 301 at the same time in order to increase the output signal generated. In an embodiment, multiple copies of an analyte may be attached to a solid phase support 312, either before or after deposition into the well 301. The solid phase support 312 may be microparticles, nanoparticles, beads, solid or porous comprising gels, or the like. For simplicity and ease of explanation, solid phase support 312 is also referred herein as a particle or bead. For a nucleic acid analyte, multiple, connected copies may be made by rolling circle amplification (RCA), exponential RCA, or like techniques, to produce an amplicon without the need of a solid support.

In particular, the solid phase support, such a bead support, can include copies of polynucleotides. In a particular example illustrated in FIG. 4, polymeric particles can be used as a support for polynucleotides during sequencing techniques. For example, such hydrophilic particles can immobilize a polynucleotide for sequencing using fluorescent sequencing techniques. In another example, the hydrophilic particles can immobilize a plurality of copies of a polynucleotide for sequencing using ion-sensing techniques. Alternatively, the above described treatments can improve polymer matrix bonding to a surface of a sensor array. The polymer matrices can capture analytes, such as polynucleotides for sequencing.

A bead support may be composed of organic polymers such as polystyrene, polyethylene, polypropylene, polyfluoroethylene, polyethyleneoxy, and polyacrylamide, as well as co-polymers and grafts thereof. A support may also be inorganic, such as glass, silica, controlled-pore-glass (CPG), or reverse-phase silica. The configuration of a support may be in the form of beads, spheres, particles, granules, a gel, or a surface. Supports may be porous or non-porous and may have swelling or non-swelling characteristics. In some embodiments, a support is an Ion Sphere Particle. Example bead supports are disclosed in U.S. Pat. No. 9,243,085, titled "Hydrophilic Polymeric Particles and Methods for Making and Using Same," and in U.S. Pat. No. 9,868,826, titled "Polymer Substrates Formed from Carboxy Functional Acrylamide," each of which is incorporated herein by reference.

In some embodiments, the solid support is a "microparticle," "bead," "microbead," etc., (optionally but not necessarily spherical in shape) having a smallest cross-sectional length (e.g., diameter) of 50 microns or less, preferably 10 microns or less, 3 microns or less, approximately 1 micron or less, approximately 0.5 microns or less, e.g., approximately 0.1, 0.2, 0.3, or 0.4 microns, or smaller (e.g., under 1 nanometer, about 1-10 nanometer, about 10-100 nanometers, or about 100-500 nanometers). In an example, the support is at least 0.1 microns. Microparticles or bead supports may be made of a variety of inorganic or organic materials including, but not limited to, glass (e.g., controlled pore glass), silica, zirconia, cross-linked polystyrene, polyacrylate, polymethylmethacrylate, titanium dioxide, latex, polystyrene, etc. Magnetization can facilitate collection and concentration of the microparticle-attached reagents (e.g., polynucleotides or ligases) after amplification, and can also facilitate additional steps (e.g., washes, reagent removal, etc.). In certain embodiments, a population of microparticles having different shapes sizes or colors is used. The microparticles can optionally be encoded, e.g., with quantum dots such that each microparticle or group of microparticles can be individually or uniquely identified.

Magnetic beads (e.g., Dynabeads from Dynal, Oslo, Norway) can have a size in a range of 1 micron to 100 microns, such as 2 microns to 100 microns. The magnetic beads can be formed of inorganic or organic materials including, but not limited to, glass (e.g., controlled pore glass), silica, zirconia, cross-linked polystyrene, polystyrene, or a combination thereof.

In some embodiments, a bead support is functionalized for attaching a population of first primers. In some embodiments, a bead is any size that can fit into a reaction chamber. For example, one bead can fit in a reaction chamber. In some embodiments, more than one bead fit in a reaction chamber. In some embodiments, the smallest cross-sectional length of a bead (e.g., diameter) is about 50 microns or less, or about 10 microns or less, or about 3 microns or less, approximately 1 micron or less, approximately 0.5 microns or less, e.g., approximately 0.1, 0.2, 0.3, or 0.4 microns, or smaller (e.g., under 1 nanometer, about 1-10 nanometer, about 10-100 nanometers, or about 100-500 nanometers).

In general, the bead support can be treated to include a biomolecule, including nucleosides, nucleotides, nucleic acids (oligonucleotides and polynucleotides), polypeptides, saccharides, polysaccharides, lipids, or derivatives or analogs thereof. For example, a polymeric particle can bind or attach to a biomolecule. A terminal end or any internal portion of a biomolecule can bind or attach to a polymeric particle. A polymeric particle can bind or attach to a biomolecule using linking chemistries. A linking chemistry includes covalent or non-covalent bonds, including an ionic bond, hydrogen bond, affinity bond, dipole-dipole bond, van der Waals bond, and hydrophobic bond. A linking chemistry includes affinity between binding partners, for example between: an avidin moiety and a biotin moiety; an antigenic epitope and an antibody or immunologically reactive fragment thereof; an antibody and a hapten; a digoxigen moiety and an anti-digoxigen antibody; a fluorescein moiety and an anti-fluorescein antibody; an operator and a repressor; a nuclease and a nucleotide; a lectin and a polysaccharide; a steroid and a steroid-binding protein; an active compound and an active compound receptor; a hormone and a hormone receptor; an enzyme and a substrate; an immunoglobulin and protein A; or an oligonucleotide or polynucleotide and its corresponding complement.

Figure 4:
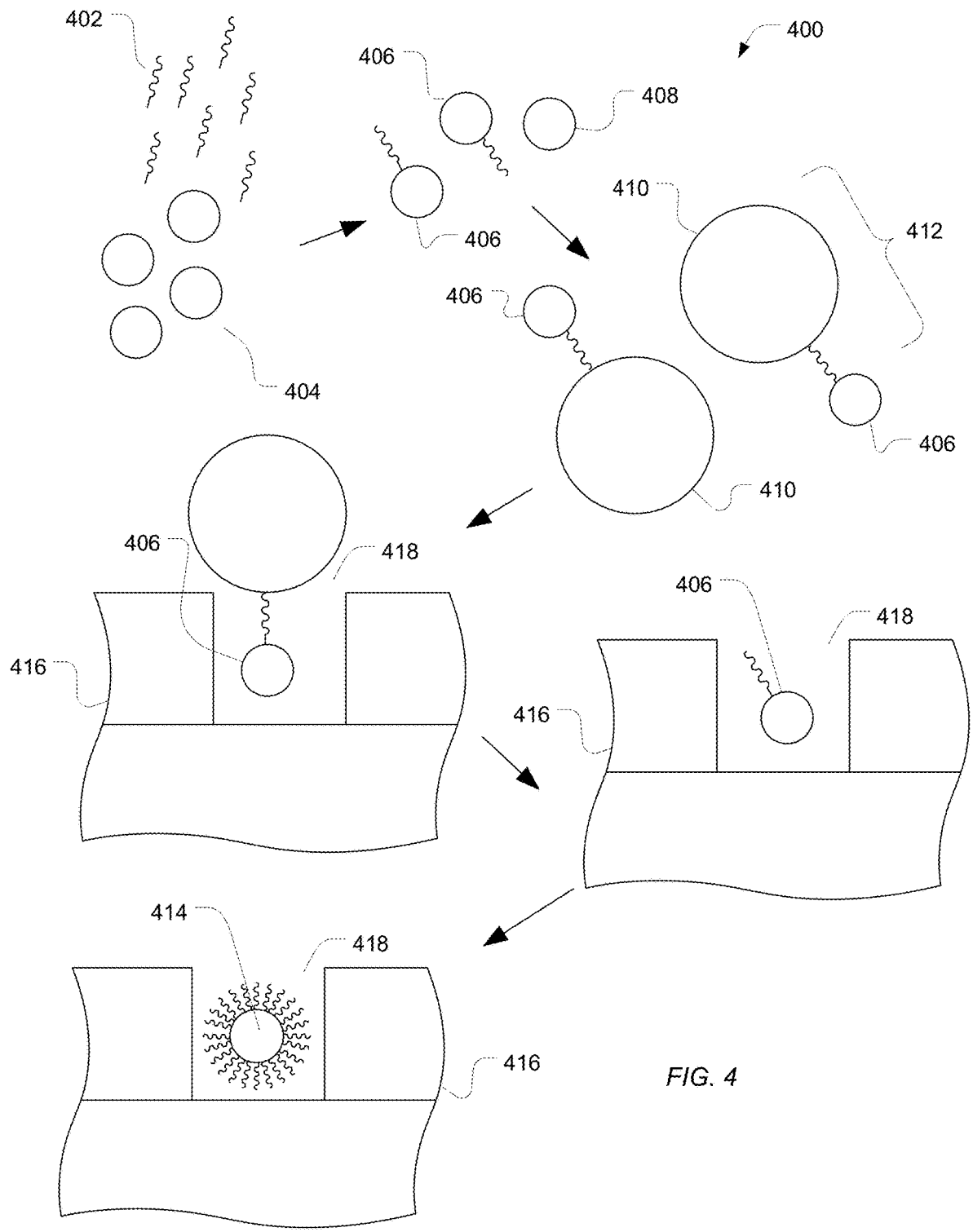
FIG. 4 includes an illustration of an example method for preparing a sequencing device.

As illustrated in FIG. 4, a plurality of bead supports 404 can be placed in a solution along with a plurality of polynucleotides 402 (target or template poylnucleotides). The plurality of bead supports 404 can be activated or otherwise prepared to bind with the polynucleotides 402. For example, the bead supports 404 can include an oligonucleotide (capture primer) complementary to a portion of a polynucleotide of the plurality of polynucleotides 402. In another example, the bead supports 404 can be modified with target polynucleotides 402 using techniques such as biotin-streptavidin binding.

In some embodiments, the template nucleic acid molecules (template polynucleotides or target polynucleotides) can be derived from a sample that can be from a natural or non-natural source. The nucleic acid molecules in the sample can be derived from a living organism or a cell. Any nucleic acid molecule can be used, for example, the sample can include genomic DNA covering a portion of or an entire genome, mRNA, or miRNA from the living organism or cell. In other embodiments, the template nucleic acid molecules can be synthetic or recombinant. In some embodiments, the sample contains nucleic acid molecules having substantially identical sequences or having a mixture of different sequences. Illustrative embodiments are typically performed using nucleic acid molecules that were generated within and by a living cell. Such nucleic acid molecules are typically isolated directly from a natural source such as a cell or a bodily fluid without any in vitro amplification. Accordingly, the sample nucleic acid molecules are used directly in subsequent steps. In some embodiments, the nucleic acid molecules in the sample can include two or more nucleic acid molecules with different sequences.

The methods can optionally include a target enrichment step before, during, or after the library preparation and before a pre-seeding reaction. Target nucleic acid molecules, including target loci or regions of interest, can be enriched, for example, through multiplex nucleic acid amplification or hybridization. A variety of methods can be used to perform multiplex nucleic acid amplification to generate amplicons, such as multiplex PCR, and can be used in an embodiment. Enrichment by any method can be followed by a universal amplification reaction before the template nucleic acid molecules are added to a pre-seeding reaction mixture. Any of the embodiments of the present teachings can include enriching a plurality of at least 2, 3, 4, 5, 6, 7, 8, 9, 10, 15, 20, 25, 30, 35, 40, 45, 50, 55, 60, 65, 70, 75, 80, 85, 90, 95, 100, 125, 150, 175, 200, 250, 300, 400, 500, 600, 700, 800, 900, 1,000, 2,000, 3,000, 4,000, 5,000, 6,000, 7,000, 8,000, 9,000, or 10,000 target nucleic acid molecules, target loci, or regions of interest. In any of the disclosed embodiments, the target loci or regions of interest can be at least 1, 2, 3, 4, 5, 6, 7, 8, 9, 10, 11, 12, 13, 14, 15, 16, 17, 18, 19, 20, 25, 50, 75, 100, 125, 150, 200, 250, 300, 400, 500, 600, 700, 800, 900, or 1,000 nucleotides in length and include a portion of or the entirety of the template nucleic acid molecule. In other embodiments, the target loci or regions of interest can be between about 1 and 10,000 nucleotides in length, for example between about 2 and 5,000 nucleotides, between about 2 and 3,000 nucleotides, or between about 2 and 2,000 nucleotides in length. In any of the embodiments of the present teachings, the multiplex nucleic acid amplification can include generating at least 2, 3, 4, 5, 6, 7, 8, 9, 10, 15, 20, 25, 30, 35, 40, 45, 50, 55, 60, 65, 70, 75, 80, 85, 90, 95, 100, 125, 150, 175, 200, 250, 300, 400, 500, 600, 700, 800, 900, 1,000, 2,000, 3,000, 4,000, 5,000, 6,000, 7,000, 8,000, 9,000, or 10,000 copies of each target nucleic acid molecule, target locus, or region of interest.

In some embodiments, after the library preparation and optional enrichment step, the library of template nucleic acid molecules can be templated onto one or more supports. The one or more supports can be templated in two reactions, a seeding reaction to generate pre-seeded solid supports and a templating reaction using the one or more pre-seeded supports to further amplify the attached template nucleic acid molecules. The pre-seeding reaction is typically an amplification reaction and can be performed using a variety of methods. For example, the pre-seeding reaction can be performed in an RPA reaction, a template walking reaction, or a PCR. In an RPA reaction, template nucleic acid molecules are amplified using a recombinase, polymerase, and optionally a recombinase accessory protein in the presence of primers and nucleotides. The recombinase and optionally the recombinase accessory protein can dissociate at least a portion of a double stranded template nucleic acid molecules to allow primers to hybridize that the polymerase can then bind to initiate replication. In some embodiments, the recombinase accessory protein can be a single-stranded binding protein (SSB) that prevents the re-hybridization of dissociated template nucleic acid molecules. Typically, RPA reactions can be performed at isothermal temperatures. In a template walking reaction, template nucleic acid molecules are amplified using a polymerase in the presence of primers and nucleotides in reaction conditions that allow at least a portion of double-stranded template nucleic acid molecules to dissociate such that primers can hybridize and the polymerase can then bind to initiate replication. In PCR, the double-stranded template nucleic acid molecules are dissociated by thermal cycling. After cooling, primers bind to complementary sequences and can be used for replication by the polymerase. In any of the aspects of the present teachings, the pre-seeding reaction can be performed in a pre-seeding reaction mixture, which is formed with the components necessary for amplification of the template nucleic acid molecules. In any of the disclosed aspects, the pre-seeding reaction mixture can include some or all of the following: a population of template nucleic acid molecules, a polymerase, one or more solid supports with a population of attached first primers, nucleotides, and a cofactor such as a divalent cation. In some embodiments, the pre-seeding reaction mixture can further include a second primer and optionally a diffusion-limiting agent. In some embodiments, the population of template nucleic acid molecules comprise template nucleic acid molecules joined to at least one adaptor sequence which can hybridize to the first or second primers. In some embodiments, the reaction mixture can form an emulsion, as in emulsion RPA or emulsion PCR. In pre-seeding reactions carried out by RPA reactions, the pre-seeding reaction mixture can include a recombinase and optionally a recombinase accessory protein. The various components of the reaction mixture are discussed in further detail herein.

In a particular embodiment of seeding, the hydrophilic particles and polynucleotides are subjected to polymerase chain reaction (PCR) amplification or recombinase polymerase amplification (RPA). In an example, the particles 404 include a capture primer complementary to a portion of the template polynucleotide 402. The template polynucleotide can hybridize to the capture primer. The capture primer can be extended to form beads 406 that include a target polynucleotide attached thereto. Other beads may remain unattached to a target nucleic acid and other template polynucleotide can be free floating in solution.

In an example, the bead support 406 including a target polynucleotide can be attached to a magnetic bead 410 to form a bead assembly 412. In particular, the magnetic bead 410 is attached to the bead support 406 by a double stranded polynucleotide linkage. In an example, a further probe including a linker moiety can hybridize to a portion of the target polynucleotide on the bead support 406. The linker moiety can be attached to a complementary linker moiety on the magnetic bead 410. In another example, the template polynucleotide used to form the target nucleic acid attached to beads 406 can include a linker moiety that attaches to the magnetic bead 410. In another example, the template polynucleotide complementary to target polynucleotide attached to the bead support 406 can be generated from a primer that is modified with a linker that attaches to the magnetic bead 410.

The linker moiety attached to the polynucleotide and the linker moiety attached to the magnetic bead can be complementary to and attach to each other. In an example, the linker moieties have affinity and can include: an avidin moiety and a biotin moiety; an antigenic epitope and an antibody or immunologically reactive fragment thereof; an antibody and a hapten; a digoxigen moiety and an anti-digoxigen antibody; a fluorescein moiety and an anti-fluorescein antibody; an operator and a repressor; a nuclease and a nucleotide; a lectin and a polysaccharide; a steroid and a steroid-binding protein; an active compound and an active compound receptor; a hormone and a hormone receptor; an enzyme and a substrate; an immunoglobulin and protein A; or an oligonucleotide or polynucleotide and its corresponding complement. In a particular example, the linker moiety attached to the polynucleotide includes biotin and the linker moiety attached to the magnetic bead includes streptavidin.

The bead assemblies 412 can be applied over a substrate 416 of a sequencing device that includes wells 418. In an example, a magnetic field can be applied to the substrate 416 to draw the magnetic beads 410 of the bead assembly 412 towards the wells 418. The bead support 406 enters the well 418. For example, a magnet can be moved in parallel to a surface of the substrate 416 resulting in the deposition of the bead support 406 in the wells 418.

The bead assembly 412 can be denatured to remove the magnetic bead 410 leaving the bead support 406 in the well 418. For example, hybridized double-stranded DNA of the bead assembly 412 can be denatured using thermal cycling or ionic solutions to release the magnetic bead 410 and template polynucleotides having a linker moiety attached to the magnetic bead 410. For example, the double-stranded DNA can be treated with low ion-content aqueous solutions, such as deionized water, to denature and separate the strands. In an example, a foam wash can be used to remove the magnetic beads.

Optionally, the target polynucleotides 406 can be amplified, referred to herein as templating, while in the well 418, to provide a bead support 414 with multiple copies of the target polynucleotides. In particular, the bead 414 has a monoclonal population of target polynucleotides. Such an amplification reactions can be performed using polymerase chain reaction (PCR) amplification, recombination polymerase amplification (RPA) or a combination thereof. Alternatively, amplification can be performed prior to depositing the bead support 414 in the well.

In a particular embodiment, an enzyme such as a polymerase is present, bound to, or is in close proximity to the particles or beads. In an example, a polymerase is present in solution or in the well to facilitate duplication of the polynucleotide. A variety of nucleic acid polymerase may be used in the methods described herein. In an example embodiment, the polymerase can include an enzyme, fragment or subunit thereof, which can catalyze duplication of the polynucleotide. In another embodiment, the polymerase can be a naturally occurring polymerase, recombinant polymerase, mutant polymerase, variant polymerase, fusion or otherwise engineered polymerase, chemically modified polymerase, synthetic molecules, or analog, derivative or fragment thereof. Example enzymes, solutions, compositions, and amplification methods can be found in WO2019/094,524, titled "METHODS AND COMPOSITIONS FOR MANIPULATING NUCLEIC ACIDS", which is incorporated herein by reference in its entirety.

While the polynucleotides of bead support 414 are illustrated as being on a surface, the polynucleotides can extend within the bead support 414. Hydrogel and hydrophilic particles having a low concentration of polymer relative to water can include polynucleotide segments on the interior of and throughout the bead support 414 or polynucleotides can reside in pores and other openings. In particular, the bead support 414 can permit diffusion of enzymes, nucleotides, primers and reaction products used to monitor the reaction. A high number of polynucleotides per particle produces a better signal.

In an example embodiment, the bead support 414 can be utilized in a sequencing device. For example, a sequencing device 416 can include an array of wells 418.

In an example, a sequencing primer can be added to the wells 418 or the bead support 414 can be pre-exposed to the primer prior to placement in the well 418. In particular, the bead support 414 can include bound sequencing primer. The sequencing primer and polynucleotide form a nucleic acid duplex including the polynucleotide (e.g., a template nucleic acid) hybridized to the sequencing primer. The nucleic acid duplex is an at least partially double-stranded polynucleotide. Enzymes and nucleotides can be provided to the well 418 to facilitate detectible reactions, such as nucleotide incorporation.

Sequencing can be performed by detecting nucleotide addition. Nucleotide addition can be detected using methods such as fluorescent emission methods or ion detection methods. For example, a set of fluorescently labeled nucleotides can be provided to the system 416 and can migrate to the well 418. Excitation energy can be also provided to the well 418. When a nucleotide is captured by a polymerase and added to the end of an extending primer, a label of the nucleotide can fluoresce, indicating which type of nucleotide is added.

In an alternative example, solutions including a single type of nucleotide can be fed sequentially. In response to nucleotide addition, the pH within the local environment of the well 418 can change. Such a change in pH can be detected by ion sensitive field effect transistors (ISFET). As such, a change in pH can be used to generate a signal indicating the order of nucleotides complementary to the polynucleotide of the particle 410.

In particular, a sequencing system can include a well, or a plurality of wells, disposed over a sensor pad of an ionic sensor, such as a field effect transistor (FET). In embodiments, a system includes one or more polymeric particles loaded into a well which is disposed over a sensor pad of an ionic sensor (e.g., FET), or one or more polymeric particles loaded into a plurality of wells which are disposed over sensor pads of ionic sensors (e.g., FET). In embodiments, an FET can be a chemFET or an ISFET. A "chemFET" or chemical field-effect transistor, includes a type of field effect transistor that acts as a chemical sensor. The chemFET has the structural analog of a MOSFET transistor, where the charge on the gate electrode is applied by a chemical process. An "ISFET" or ion-sensitive field-effect transistor, can be used for measuring ion concentrations in solution; when the ion concentration (such as H+) changes, the current through the transistor changes accordingly.

In embodiments, the FET may be part of a FET array. As used herein, an "array" is a planar arrangement of elements such as sensors or wells. The array may be one or two dimensional. A one-dimensional array can be an array having one column (or row) of elements in the first dimension and a plurality of columns (or rows) in the second dimension. The number of columns (or rows) in the first and second dimensions may or may not be the same. The FET or array can comprise $10^2$, $10^3$, $10^4$, $10^5$, $10^6$, $10^7$ or more FETs.

In embodiments, one or more microfluidic structures can be fabricated above the FET sensor array to provide for containment or confinement of a biological or chemical reaction. For example, in one implementation, the microfluidic structure(s) can be configured as one or more wells (or wells, or reaction chambers, or reaction wells, as the terms are used interchangeably herein) disposed above one or more sensors of the array, such that the one or more sensors over which a given well is disposed detect and measure analyte presence, level, or concentration in the given well. In embodiments, there can be a 1:1 correspondence of FET sensors and reaction wells.

Returning to FIG. 4, in another example, a well 418 of the array of wells can be operatively connected to measuring devices. For example, for fluorescent emission methods, a well 418 can be operatively coupled to a light detection device. In the case of ionic detection, the lower surface of the well 418 may be disposed over a sensor pad of an ionic sensor, such as a field effect transistor.

One example system involving sequencing via detection of ionic byproducts of nucleotide incorporation is the Ion Torrent PGM™, Proton™ or S5™ sequencer (Thermo Fisher Scientific), which is an ion-based sequencing system that sequences nucleic acid templates by detecting hydrogen ions produced as a byproduct of nucleotide incorporation. Typically, hydrogen ions are released as byproducts of nucleotide incorporations occurring during template-dependent nucleic acid synthesis by a polymerase. The Ion Torrent PGM™, Proton™, or S5™ sequencer detects the nucleotide incorporations by detecting the hydrogen ion byproducts of the nucleotide incorporations. The Ion Torrent PGM™, Proton™ or S5™ sequencer can include a plurality of template polynucleotides to be sequenced, each template disposed within a respective sequencing reaction well in an array. The wells of the array can each be coupled to at least one ion sensor that can detect the release of H+ ions or changes in solution pH produced as a byproduct of nucleotide incorporation. The ion sensor comprises a field effect transistor (FET) coupled to an ion-sensitive detection layer that can sense the presence of H+ ions or changes in solution pH. The ion sensor can provide output signals indicative of nucleotide incorporation which can be represented as voltage changes whose magnitude correlates with the H+ ion concentration in a respective well or reaction chamber. Different nucleotide types can be flowed serially into the reaction chamber and can be incorporated by the polymerase into an extending primer (or polymerization site) in an order determined by the sequence of the template. Each nucleotide incorporation can be accompanied by the release of H+ ions in the reaction well, along with a concomitant change in the localized pH. The release of H+ ions can be registered by the FET of the sensor, which produces signals indicating the occurrence of the nucleotide incorporation. Nucleotides that are not incorporated during a particular nucleotide flow may not produce signals. The amplitude of the signals from the FET can also be correlated with the number of nucleotides of a particular type incorporated into the extending nucleic acid molecule thereby permitting homopolymer regions to be resolved. Thus, during a run of the sequencer multiple nucleotide flows into the reaction chamber along with incorporation monitoring across a multiplicity of wells or reaction chambers can permit the instrument to resolve the sequence of many nucleic acid templates simultaneously.

Figure 5:
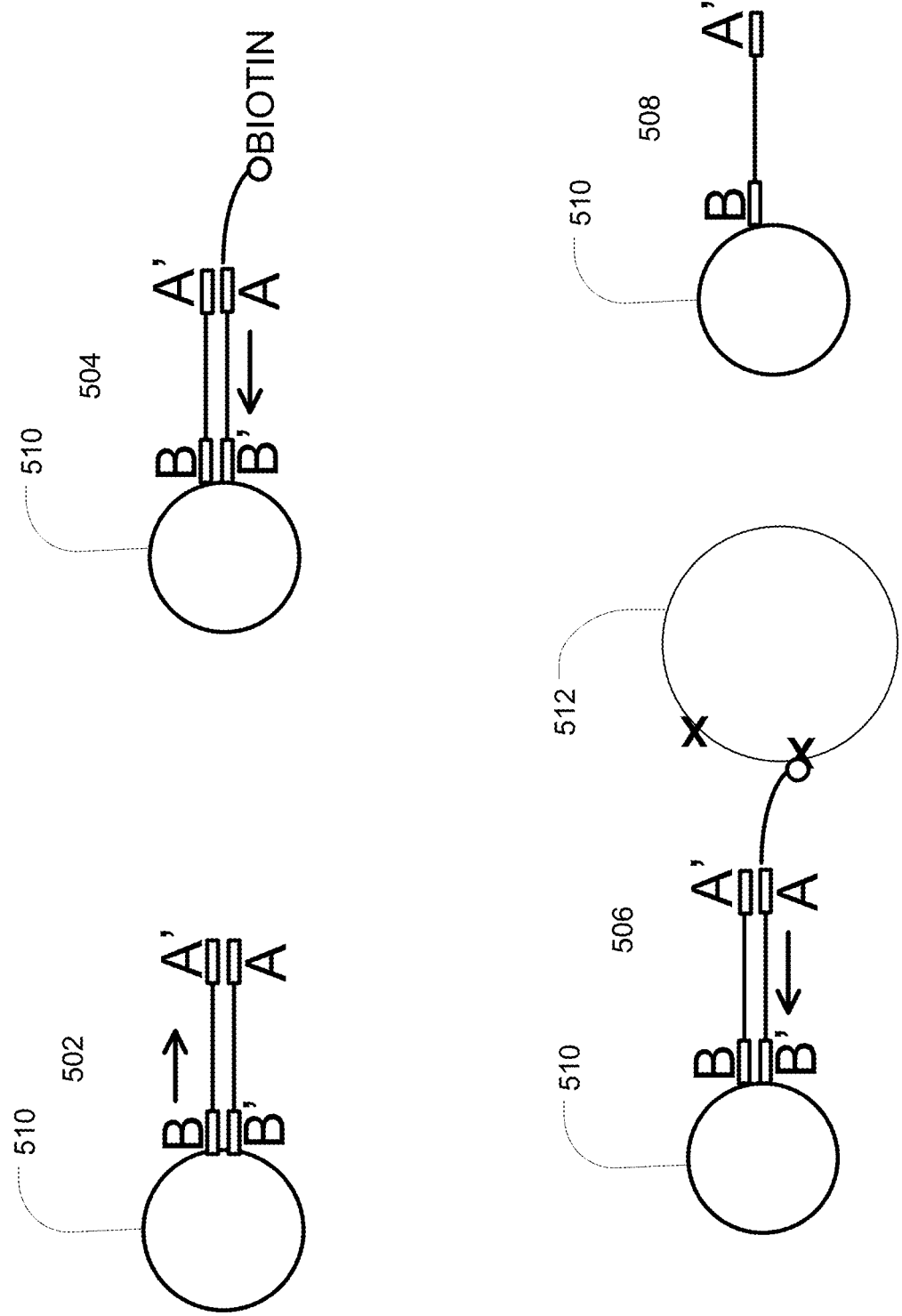
FIG. 5 illustrates an example schema for preparing a bead assembly.

Seeding the bead supports and capture by the magnetic beads can be performed through various methods. For example, turning to FIG. 5 at 502, a template polynucleotide (B'-A) can be captured by a capture probe (B) attached to a bead support 510. The capture probe (B) can be extended complementary to the template polynucleotide. Optionally, the resultant double-stranded polynucleotide can be denatured removing the template nucleic acid (B'-A) and leaving a single-stranded (B-A') attached to the bead support 510. As illustrated at 504, a primer (A) modified with a linker moiety, such as biotin, can be hybridized to a portion (A') of the nucleic acid (B-A') attached to the bead support 510. Optionally, the primer (A) can be extended to form a complementary nucleic acid (A-B').

As illustrated 506, a magnetic bead 512 can be introduced to the solution. The magnetic bead 512 can include a linker complementary to the linker moiety attached to the primer (A). For example, the linker attached to the primer (A) can be biotin and the magnetic bead 512 can be coated with streptavidin. As described above, the magnetic bead 512 can be utilized to clean the solution and to assist with deposition of the bead support 510 and the attached nucleic acid (B-A') into a well of a sequencing device. As illustrated 508, double-stranded polynucleotide can be denatured, resulting in the dehybridization of the nucleic acid (B'-A) from the nucleic acid (B-A') attached to the bead support 510. As such, the bead support 510 is deposited into the wells of the sequencing device and has a single stranded target nucleic acid (B-A'). Alternatively, the linker modified probe (A) may not be extended to form a complementary polynucleotide with a length the polynucleotide (B-A'). Extension reactions can be carried out using polymerase chain reaction (PCR), recombinase polymerase amplification (RPA), or other amplification reactions.

Figure 6:
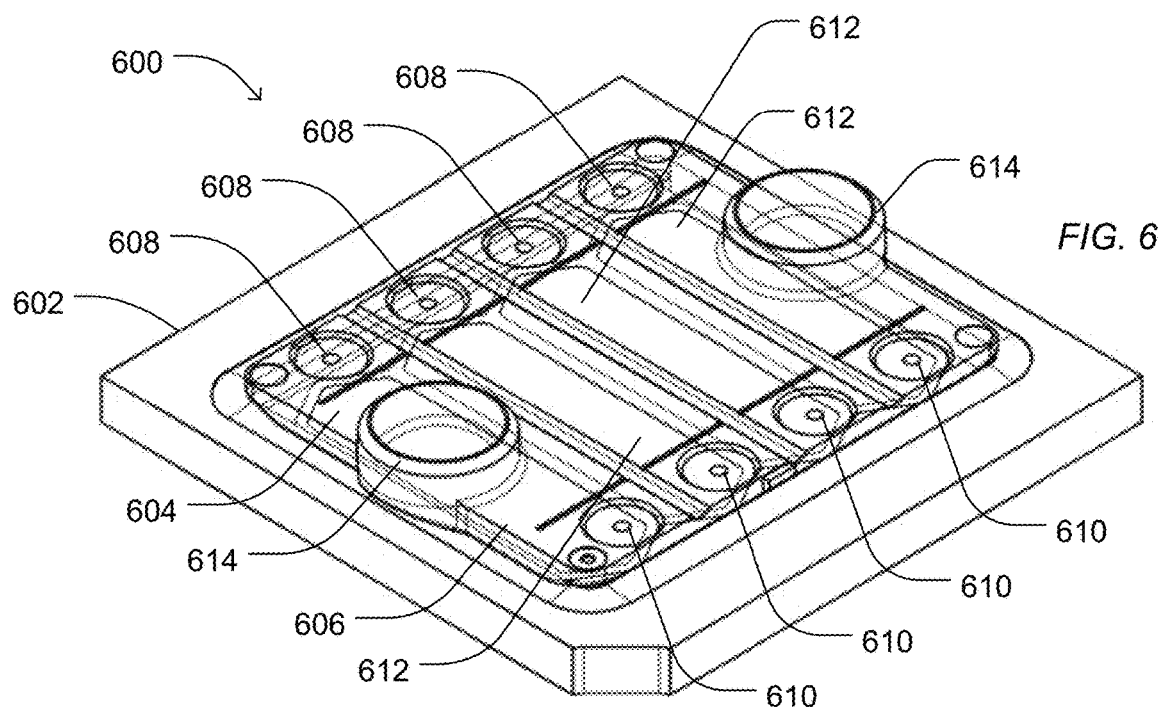
FIG. 6 and FIG. 7 include illustrations of an example sensor device.
Figure 7:
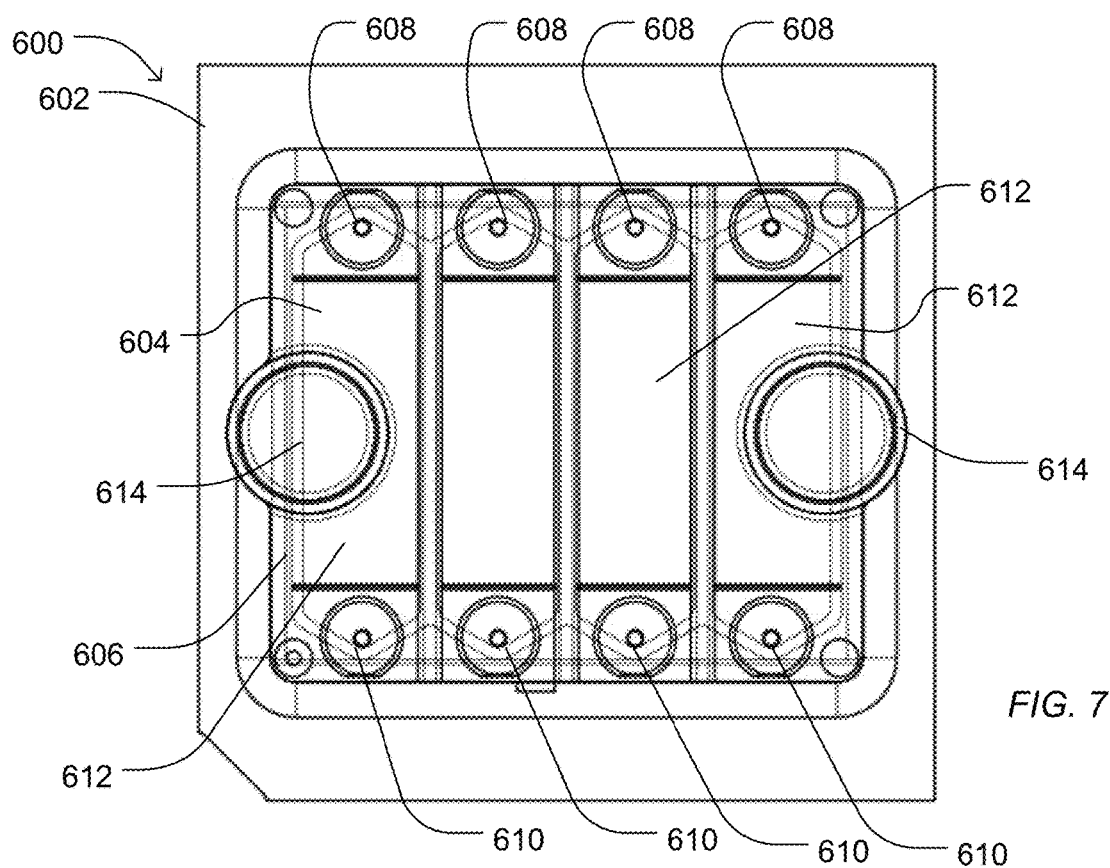

In an example, the biosensor and flow cell comprise a sensor device. FIG. 6 and FIG. 7 illustrate an example sensor device 600, such as a microchip including a flow cell. For example, the sensor device 600 includes a substrate 602 securing a die 604 that has a plurality of microwells in fluid communication with a sensor array. A flow cell 606 is secured over the substrate, providing a volume over the die 604.

In an example, the flow cell 606 includes a set of fluid inlets 608 and a set of fluid outlets 610. In particular, the flow cell can be divided into lanes 612. Each lane 612 is individually accessed by a respective fluid inlet 608 and fluid outlet 610.

As illustrated, the sensor device 600 includes four lanes 612. Alternatively, the sensor device 600 can include less than four lanes or more than four lanes. For example, sensor device 600 can include between 1 and 10 lanes, such as between 2 and 8 lanes, or 4 to 6 lanes. The lanes 612 can be fluidically isolated from each other. As such, the lanes 612 can be used at separate times, concurrently, or simultaneously, depending upon aspects of a run plan.

The sensor device 600 can further include guides structures 614, for example, formed as part of the flow cell 606, to engage complementary structures on a fluidic coupler. Such guide structures 614 assist with aligning the fluid inlets 608 and fluid outlet 610 with associated ports on a fluidic coupler.

Figure 8:
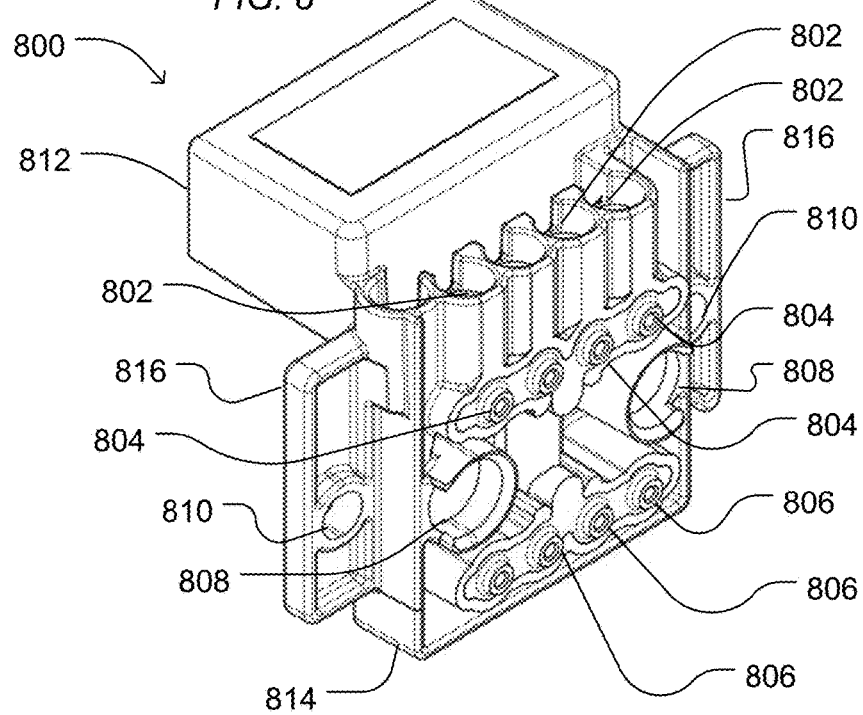
FIG. 8, FIG. 9, and FIG. 10 include illustrations of an example fluidic coupler.
Figure 9:
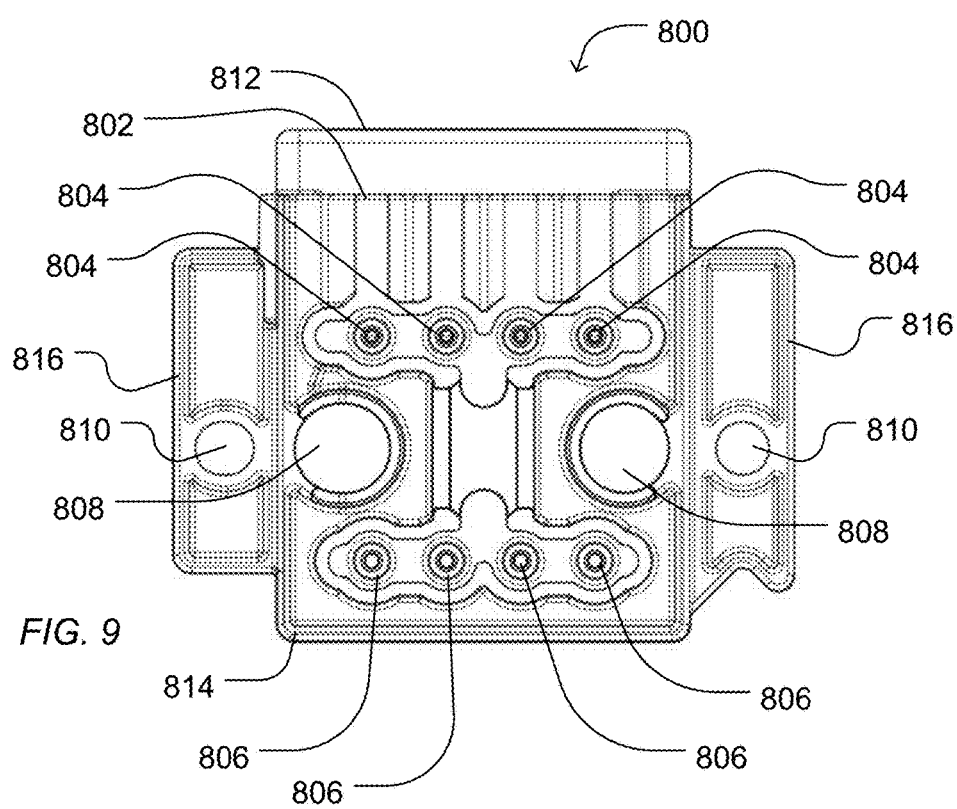
Figure 10:
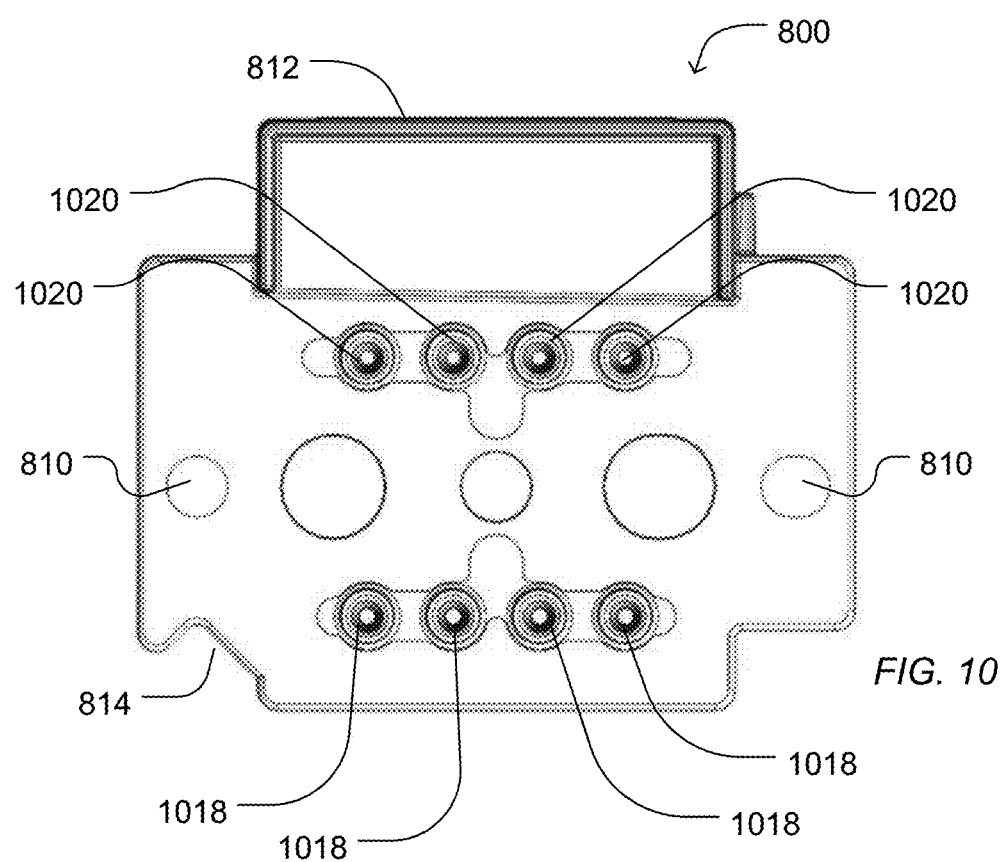

FIG. 8, FIG. 9, and FIG. 10 include illustrations of an example fluidic coupler 800. The fluidic coupler 800 includes a body 814 defining fluidic pathways between sets of ports. Further, the fluidic coupler 800 can include a connector section 812 to engage a mechanical assembly and assist with positioning the fluidic coupler 800 relative to the mechanical assembly. In another example, the fluidic coupler 800 can include wings 816 defining reference holes 810 to engage guide rods of a mechanical assembly, further assisting with positioning the fluidic coupler 800 relative to a sensor device.

The body 814 of the fluidic coupler 800 can define openings 802 that are in fluidic communication with a first set of ports 804. The openings 802 can be sized to receive an end of a pipette tip and allow pipetting of a fluid composition into the opening 802. The openings 802 are in fluidic communication with a set of ports 804, which are configured to engage inlets 608 of a sensor device 600 (FIG. 6). The fluidic coupler 800 can further define a second set of ports 806 that can engage and provide fluidic communication with outlets 610 of the sensor device 600 (FIG. 6).

As illustrated in FIG. 10, the system can further include a third set of ports 1018 that are in fluidic communication with the second set of ports 806. The third set of ports 1018 can engage with a fluidic manifold of a mechanical assembly, such as the fluidic manifold 1740 illustrated in FIG. 18 and FIG. 19. Optionally, the fluidic coupler 800 can include a fourth set of ports 1020, which can connect with a fluidic manifold or can be blocked depending upon the configuration of the mechanical assembly.

The ports 804, 806, 1018 or 1020 can be formed of a resilient material, such as a rubber or elastomeric polymer. In an example, the ports can be formed as an overmold using the resilient material.

Returning to FIG. 8, the body 814 of the fluidic coupler 800 can further include guide features 808 complementary to guide features 614 of the sensor device 600 (FIG. 6).

Figure 11:
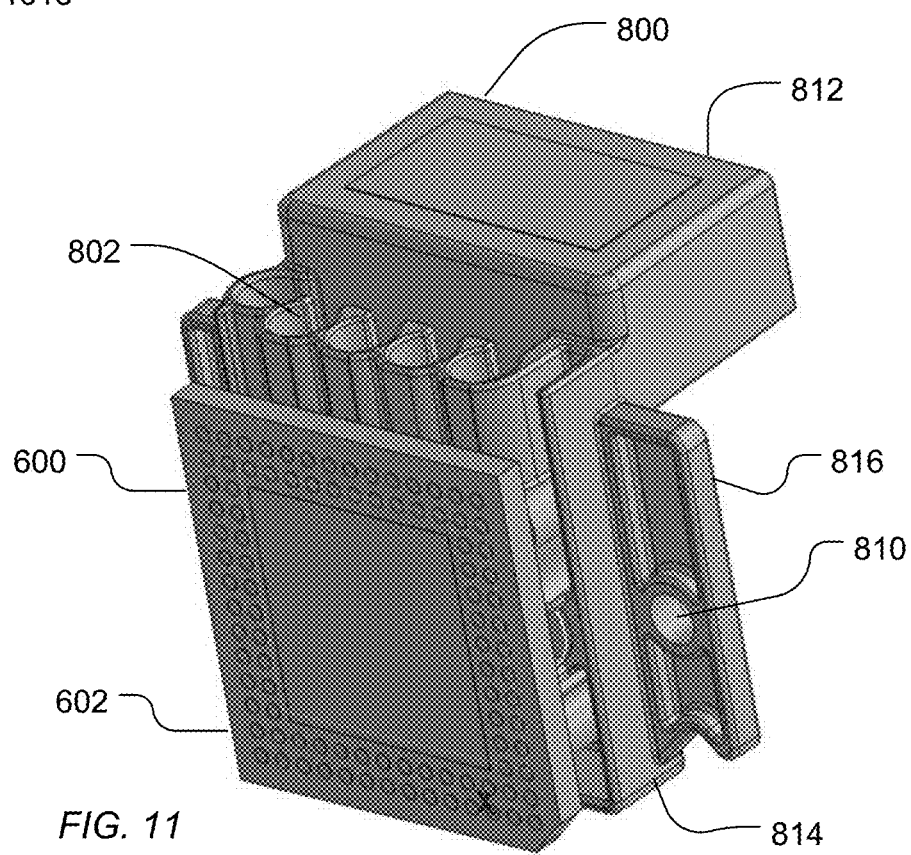
FIG. 11 and FIG. 12 include illustrations of an example interconnection between a sensor device and a fluidic coupler.
Figure 12:
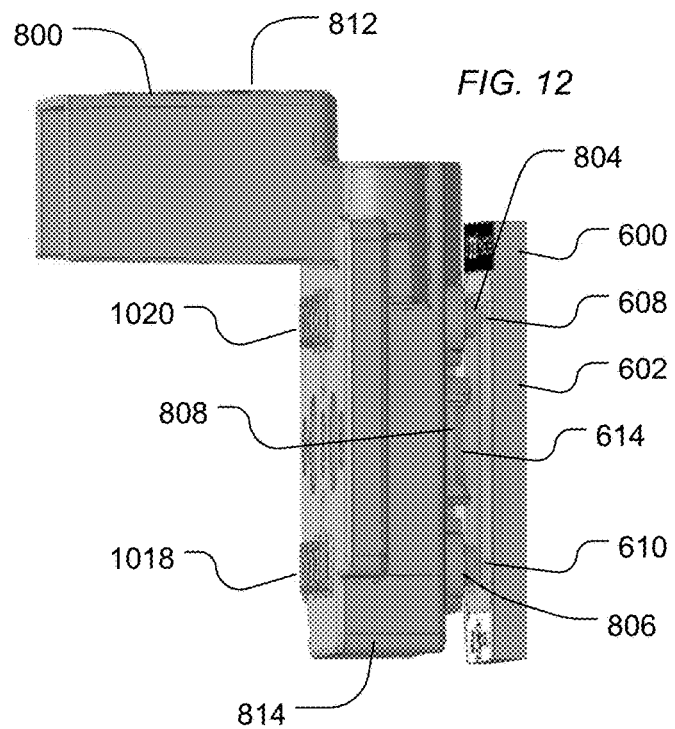

As illustrated in FIG. 11 and FIG. 12, the fluidic coupler 800 can engage the sensor device 600. The body 814 of the fluidic coupler 800 can be aligned with the substrate 602 of the sensor device 600 to allow the first set of ports 804 of the fluidic coupler 800 to be in fluid communication with the inlets 608 of the sensor device 600. Further, the second set of ports 806 can be in fluidic communication with the outlets 610 of the sensor device 600. For example, the guide structures 614 and 808 can engage to align the ports with the inlets and outlets. Optionally, a third set of ports 1018 can be in fluid communication with a manifold. In a further example, a set of fluid ports 1020, optionally in fluid communication with the second set of port 608, can be in fluidic communication with a fluidic manifold.

Accordingly, fluid compositions can be pipetted into the openings 802 in fluid communication with the first set of ports 804, which provide the fluidic composition to the flow cell 606 of the sensor device 600 via the inlets 608 of the flow cell 606. After processing, the remainder of the fluidic composition can be drawn out of the outlet 610 of the sensor device 600 through the second set of ports 806 and the third set of ports 1018 into a fluid manifold.

Figure 13:
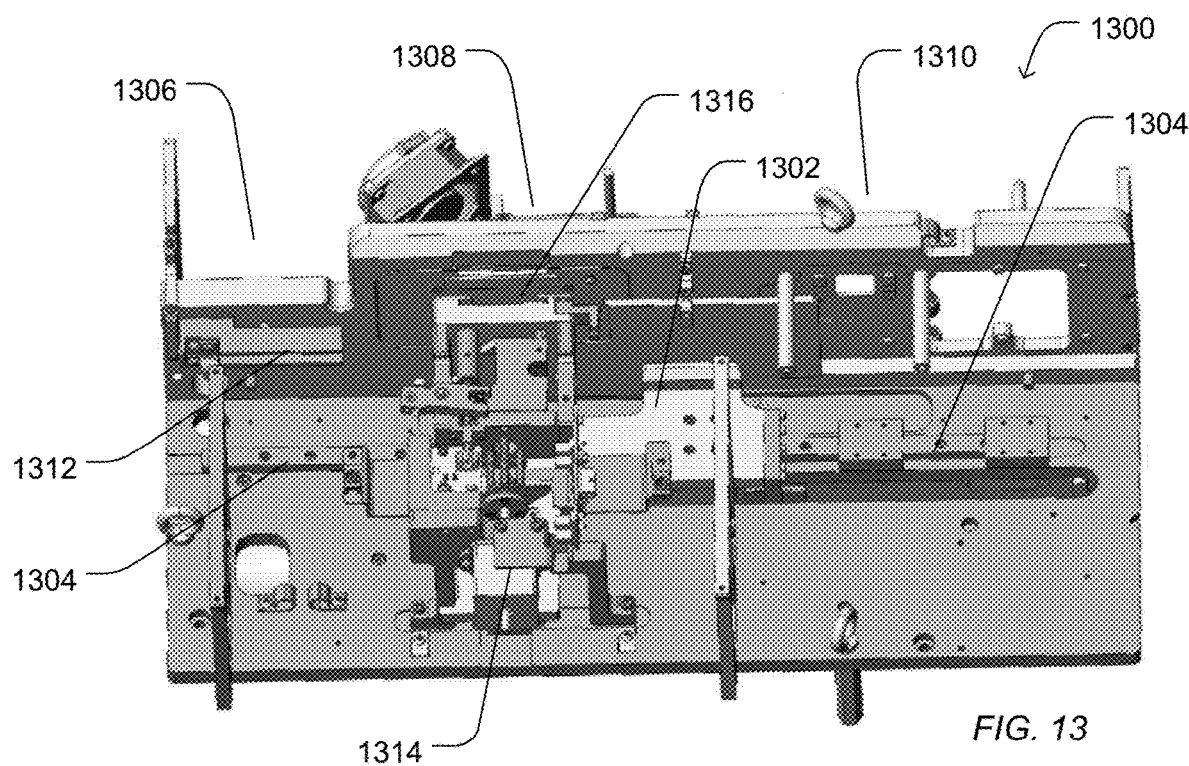
FIG. 13 and FIG. 14 include illustrations of an example mechanical system to interact with a sensor device.
Figure 14:
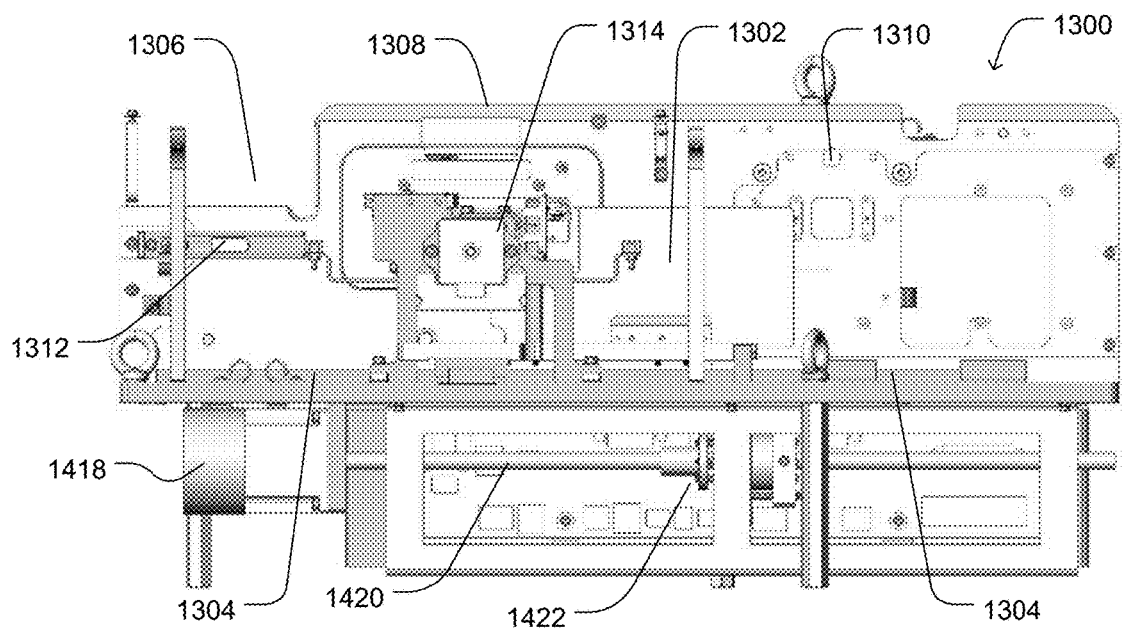

FIG. 13 and FIG. 14 include illustrations of an example mechanical system 1300 for moving a sensor device between various stations within the system. For example, a slide mechanism 1302 can move along a rail 1304 to guide a sensor device (e.g., sensor device 600 in FIG. 6) between stations 1306, 1308, and 1310. For example, a sensor device can be inserted into the slide mechanism 1302 at station 1306. In an example, the sensor device can be inserted in a vertical orientation in which the inlet and outlet are directed to a side in contrast to upward. A sensor 1312 can detect the presence of the sensor device and allow the slide mechanism 1302 to move when the sensor device is present. For example, the slide mechanism 1302 can move the sensor device to station 1308 where the sensor device can be loaded with samples, such as through a magnetic loading method described above in relation to FIG. 4. In particular, a fluidic coupler can be inserted into space 1316 provided by the mechanical assembly 1314, which can press the fluidic coupler against the sensor device and engage the fluidic coupler with a manifold. When the magnetic loading technique is complete, the mechanical assembly 1314 can detach from the fluidic coupler, and the slide 1302 can move the sensor device to a subsequent station 1310, such as a fluidic station providing reagents and other conditions for sequencing.

As illustrated in FIG. 14, a drive 1418, such as a screw drive, can include a screw 1420 that engages a clutch 1422 to move the slide 1302 and thus the sensor device between the stations 1306, 1308, and 1310.

Figure 15:
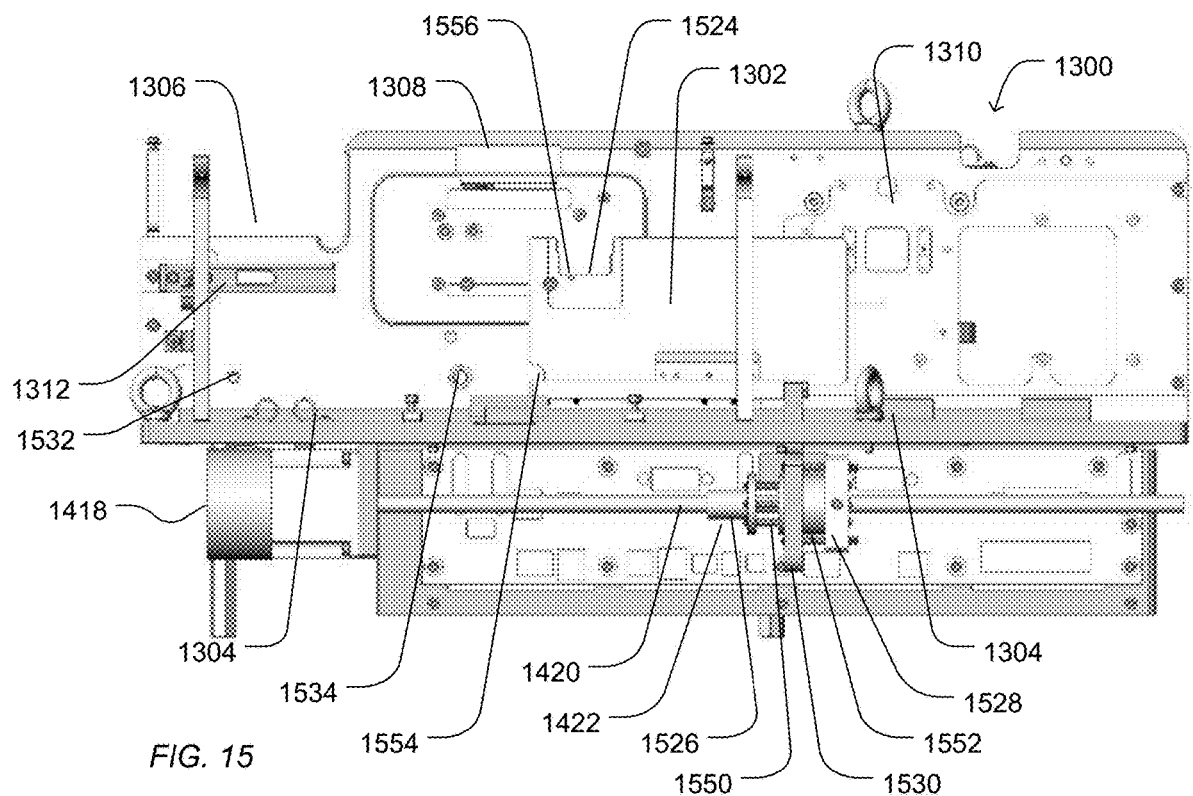
FIG. 15 and FIG. 16 include illustrations of example slide mechanism for use with the mechanical system.
Figure 16:
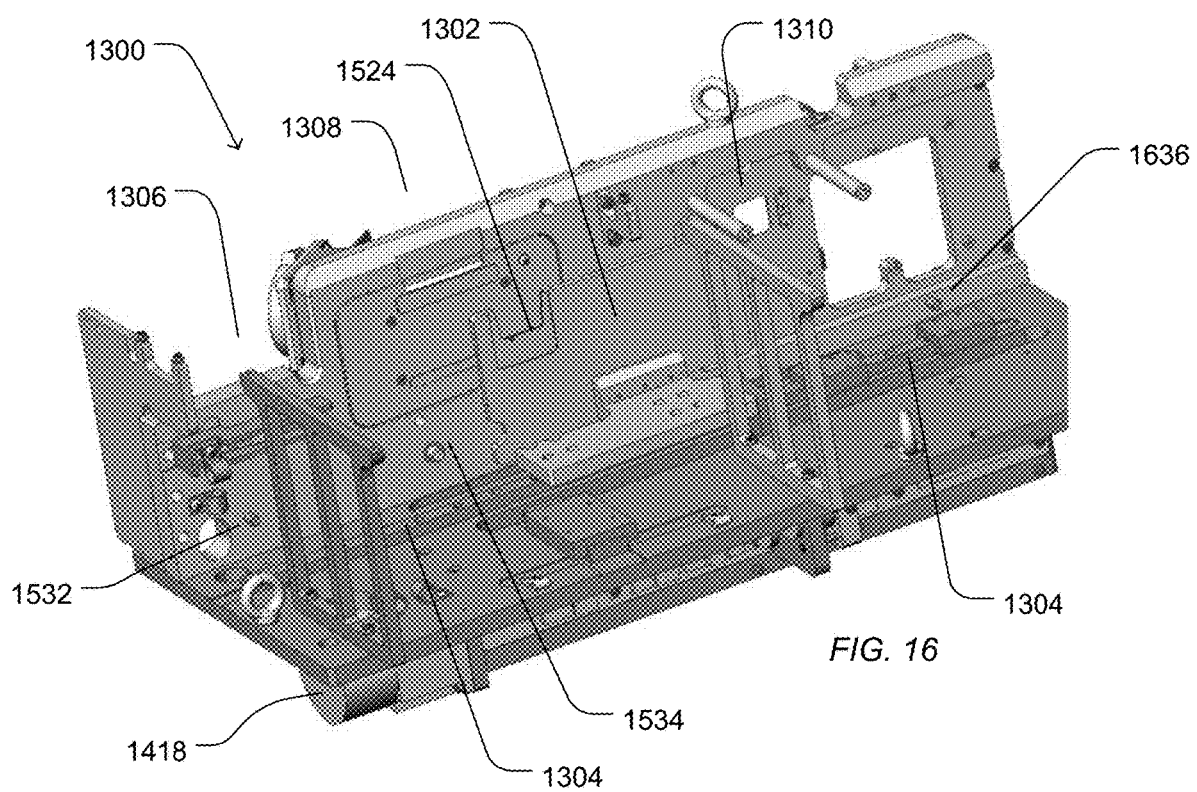

As illustrated in FIG. 15, the slide 1302 can be positioned at station 1306 in which a stop post 1532 engages the slide 1302 at feature 1554. Further, the slide 1302 can move forward from station 1306 to station 1308 at which a solenoid stop post 1534 can be engaged, and the slide moved backwards (left as illustrated) to engage the solenoid stop 1534 with the feature 1554. In addition, the slide 1302 can be moved along the rail 1304 to engage a forward stop 1636, illustrated in FIG. 16, aligning the slide and sensor receptacle 1524 with the station 1310. To return the slide 1302 back to station 1306, the solenoid stop post 1534 can be disengaged to permit the slide 1302 to pass.

When a sensor device is inserted into the receptacle 1524 at station 1306, a sensor 1312 can sense the presence of the sensor device in the receptacle 1524 through opening 1556. For example, the sensor device 1312 can be an optical sensor that optically detects the presence of the sensor device within the receptacle 1524 through the opening 1556.

The clutch 1422 can be used to provide both a backwards force (illustrated as toward the left) against stops 1532 or 1534 and a forward force (illustrated as toward the right) against the stop 1636. For example, the clutch system 1422 includes a nut 1526 to engage the screw 1420 of the screw drive mechanism 1418. The nut 1526 is engaged with a coupling 1528 having a central bore that allows the screw 1420 to pass through the coupling 1528. The coupling 1528 is attached to the nut 1526 using pin and spring system 1550.

The pins are movably connected to the nut so that when the springs of the pin and spring system 1550 compress, the pins move through the nut 1526.

The coupling 1528 is also connected to a connector plate 1530 using pin and spring systems 1552. The pins of the pin and spring system 1552 can be configured to move through the connector plate 1530 when the springs of the pin and springs system 1552 are compressed. Alternatively or in addition, the pins of the pin and spring system 1552 can be configured to move through the coupling 1528.

The connector plate 1530 is coupled to the slide 1302 moving back and forth in response to a rotation of the screw 1420. When the slide 1302 is moved backwards (illustrated as left in FIG. 15) against the stop 1532 or 1534, the springs of the pin and spring system 1552 can compress, and the pins can move through either the connector plate 1530 or the coupling 1528. As such, rotation of the screw 1420 provides a known force backwards against the rods 1532 or 1534, providing for precise positioning of the sensor device within the receptacle 1524. In a further example, as the slide 1302 is moved forward to engage the stop 1636, the slide 1302 stops moving. Additional rotation of the screw 1420 moves the nut further forward (illustrated as right in FIG. 15). The springs of the pin and springs system 1550 compress, and the pins of the pin and spring system 1550 move through the nut 1526, providing a known force of the slide 1302 against the forward stop 1636. Such a force and positioning provides precise location of the sensor device receptacle 1524 and sensor device at station 1310.

Figure 17:
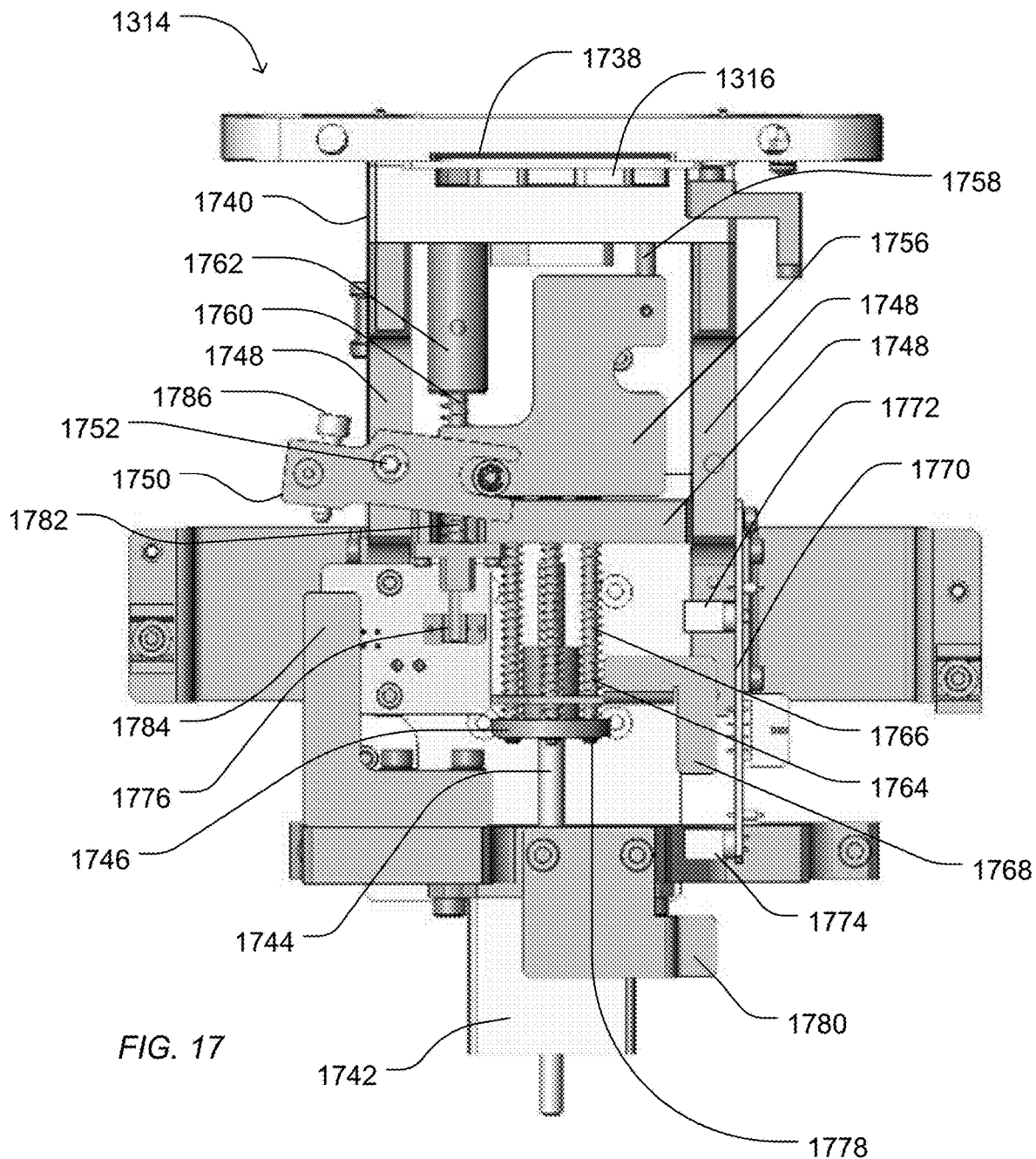
FIG. 17 includes an illustration of an example mechanical assembly to provide fluidic connection between the fluidic coupler and the sensor device.

FIG. 17 includes an illustration of an example mechanical assembly 1314 to provide a fluidic coupling between the sensor device and a fluidic coupler. When the slide is in position, a space 1738 is provided for the sensor device. Further, a space 1316 is provided for a fluidic coupler. When engaged by the mechanical assembly 1314, a fluidic coupler is pressed in fluid communication with the sensor device and with the manifold 1740. The drive mechanism 1742 utilizing, for example, a screw drive with a screw 1744, can move a frame 1748 of the mechanical assembly 1314 forward (illustrated as up along the page in FIG. 17) and backwards (illustrated is down along the page in FIG. 17) utilizing clutch system having a nut 1746 and coupled to the frame 1748 by pins 1764 and springs 1766. The pins 1764 can be movably coupled with the nut 1746 such that the heads 1778 of the pins 1764 are positioned against the nut 1746 until the manifold 1740 is pressed against a fluidic coupler. Additional movement of the nut 1746 forward causes the pins 1764 to move through the nut 1746, allowing the springs 1766 to compress.

The frame components 1748 can move together forward and back in response to the movement of the nut 1746. A lever 1750 is rotatably coupled to the frame 1748 at fastener 1752. When the assembly is in a rearward position, an adjustment screw 1786 attached to the lever 1750 engages a stop 1784, pivoting an opposite side of the lever 1750 rearward (downward as illustrated). As the nut 1746 moves forward, the adjustment screw 1786 gradually disengages from the stop 1784, and the opposite side of the lever 1750 is pivoted forward, for example, motivated by a spring 1782. The pivoting of the lever 1750 moves a guide plate 1756 forward relative to the frame 1748 that is also moving forward (upward as illustrated). The guide plate 1756 is connected to guide rods 1758 and 1760 that move forward with the guide plate 1756 to engage reference holes of a fluidic coupler. The guide rod 1760 can be further guided by a guide 1762 that engages a portion of the manifold 1740. As the guide rod 1760 moves forward, it can disengage from a sensor 1776, indicating that the guide rod 1760 is engaging the reference hole of the fluidic coupler.

When the manifold 1740 and the guide rods 1758 and 1760 engage the fluidic coupler, the nut 1746 can continue forward while the frame 1746 remains stationary. The pins 1764 can move through the nut 1746 and the springs 1766 compress, providing a known force against the fluidic coupler and against the sensor device in fluid communication with the fluidic coupler. Such force provides a desirable leak-free fluidic coupling between the sensor device and the fluidic coupler.

A circuit board 1770 including sensors 1772 and 1774 can be connected to the movable frame 1748 and can move with the frame 1748. A flag 1768 can be connected to the nut 1746. From the rearward position to a second position in which the manifold 1740 and frame 1748 connect with the fluidic coupler, the position of the flag 1768 remains constant relative to the position sensor 1772. Once the manifold 1740 is positioned against the fluidic coupler and a sensor device, the nut 1746 moves forward relative to the frame 1748. Thus, the flag 1768 moves forward towards the sensor 1772. When the flag 1768 is detected by the sensor 1772, the forward drive of the nut 1746 can be stopped. As such, a known compression of the springs 1766 is achieved, and a known force is applied against the frame 1748, manifold 1740, and fluidic coupler.

As the nut 1746 is moved rearward from the forward position, the flag 1768 disengages from the sensor 1772 until the pins 1764 at their head 1778 are secured against the nut 1746. As the nut 1746 continues to move backwards, the frame 1748 and manifold 1740 are drawn rearward along with the sensor circuit board 1770. The adjustable screw 1786 engages the stop 1784, withdrawing the guide rods 1758 and 1760 from the reference holes of the fluidic coupler. As the guide rods are withdrawn from the fluidic coupler, the reference rod 1760 engages the sensor 1776 indicating it has been withdrawal from the reference hole of the fluidic coupler. The sensor 1774 continues to move backwards with the sensor circuit board 1770 attached to the frame 1748 until the sensor 1774 engages a flag 1780 indicating that the nut 1746 is in the rearward most position. The fluidic coupler is disengaged from the mechanical assembly 1314 and can be removed. Further, the slide mechanism 1302 can move the sensor device to the next station 1310.

Figure 18:
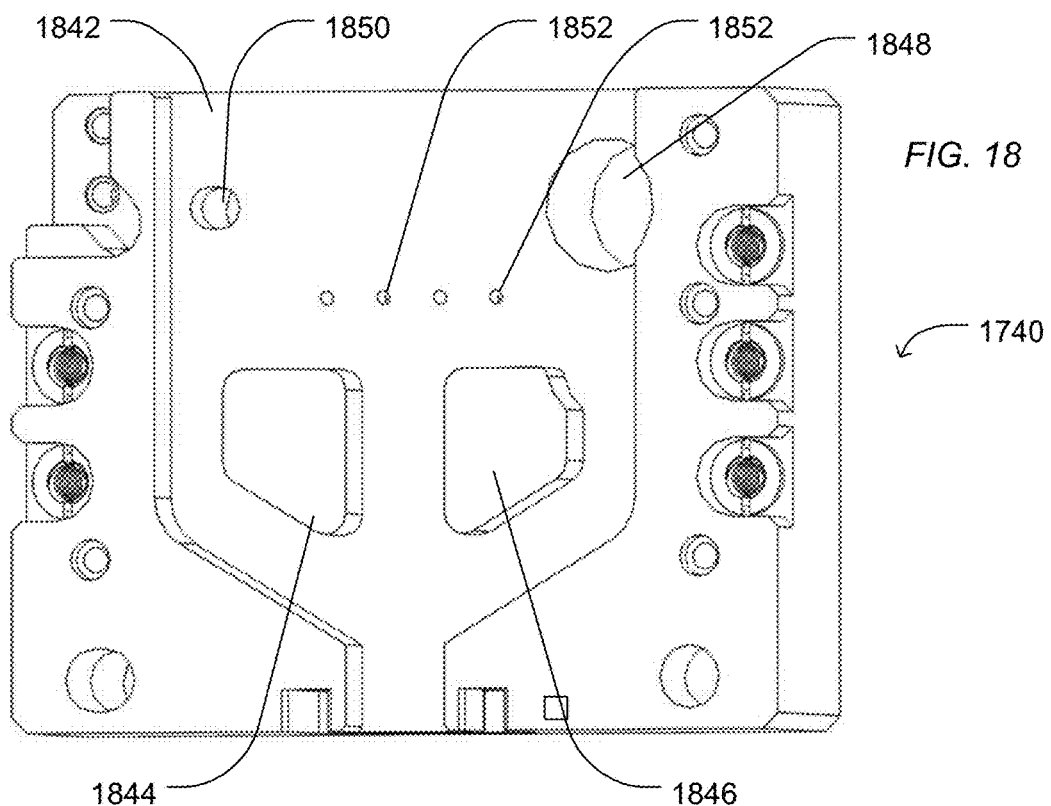
FIG. 18 and FIG. 19 include illustrations of example fluidic manifold.
Figure 19:
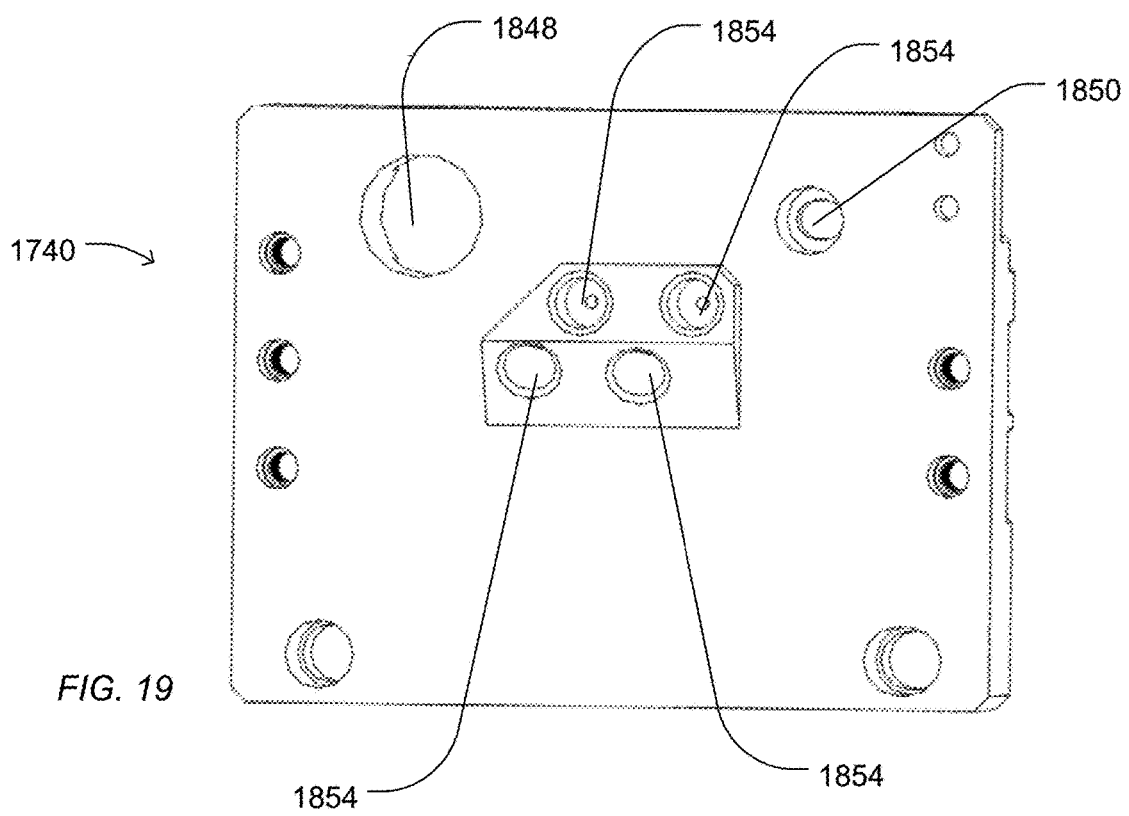

FIG. 18 and FIG. 19 include illustrations of an example manifold 1740 for use with the mechanical assembly 1314. The manifold 1740 can include at a front surface a slot 1842 to receive the fluidic coupler. The slot 1842 along with rest structures 1844 and 1846 can set a vertical position of a fluidic coupler, such as the fluidic coupler 800 illustrated in FIG. 8. The connector section 812 of the fluidic coupler 800 can extend over the manifold 1740 towards the rear surface of the manifold. The manifold 1740 can further include reference holes 1850 and 1848 that align with the reference holes 810 of the fluidic coupler 800. The reference hole 1850 can be sized to receive the guide rod 1758. The reference hole 1848 can be sized to receive the guide rod 1760 and optionally the guide 1762.

In particular, the manifold 1740 includes a set of fluid openings 1852 to engage the third ports 1018 of the fluidic coupler 800 (illustrated in FIG. 10). The set of openings 1852 are in fluid communication with a set of ports 1854 disposed on a rearward surface of the fluid manifold 1740. Such ports 1854 can be connected to a vacuum to allow fluid to be drawn through the ports 1854, the openings 1852, the third set of ports 1018 of a fluidic coupler 800, and the second set of ports 806 of a fluidic coupler 800. Optionally, an additional set of fluid openings and flow ports can be provided to connect with the fourth set of fluid ports 1020 of the fluidic coupler 800.

Figure 20:
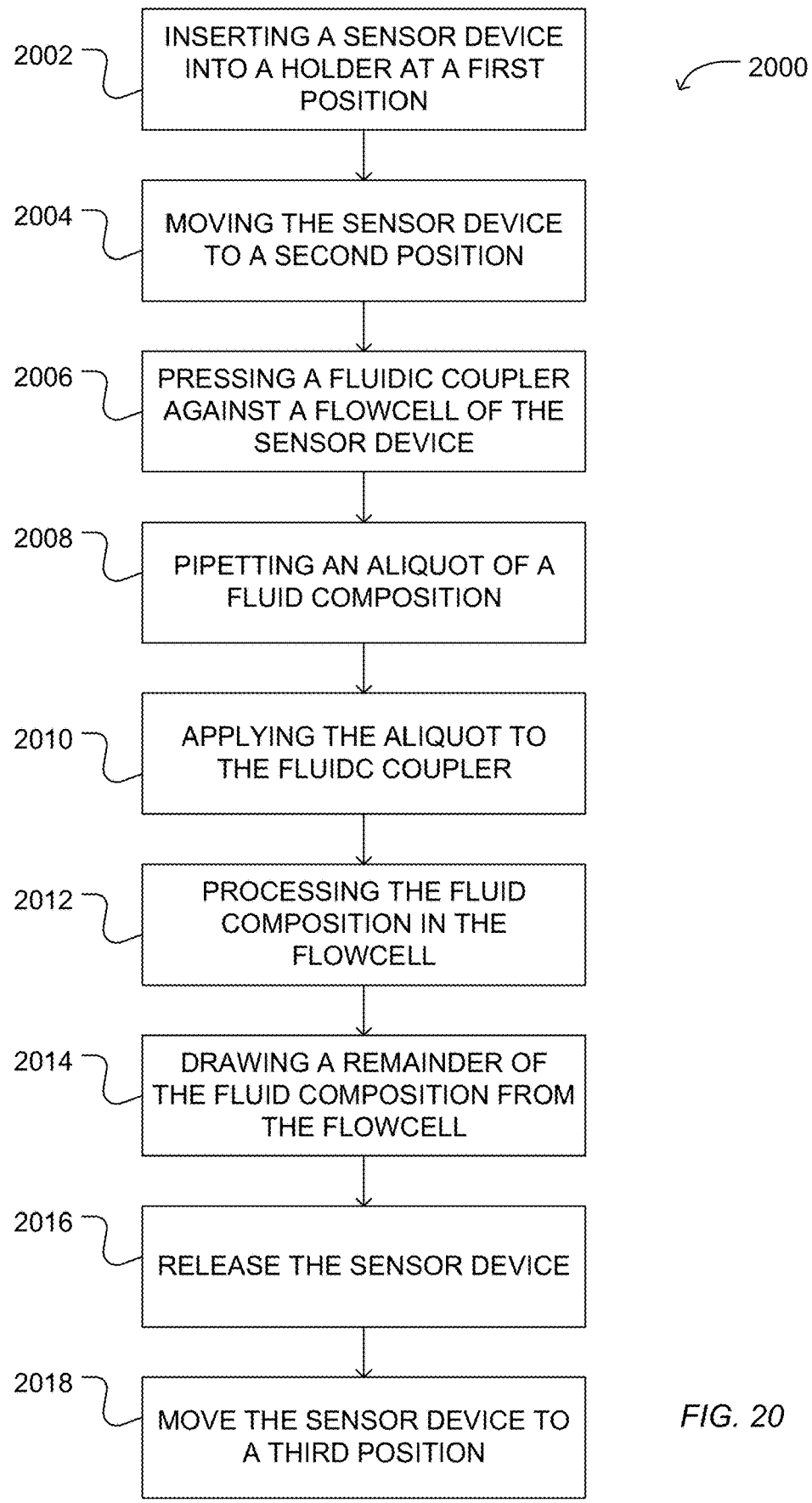
FIG. 20 includes a block flow diagram of an example method for interacting with a sensor device using the mechanical system.

FIG. 20 includes a block flow diagram illustrating a method 2000 for fluidically engaging a sensor device. For example, as illustrated at block 2002, a sensor device can be inserted into a holder or receptacle of the slide when the slide is in a first position. Optionally, a detector can determine whether the sensor device is properly positioned within the holder or receptacle prior to allowing movement of the slide to a second position.

As illustrated at block 2004, the sensor device and slide can be moved to a second position. In an example system, the second position can represent a position in which a sample is loaded onto the sensor device. For example, a fluidic coupler can be pressed against a flow cell of the sensor device, as illustrated at block 2006. The fluidic coupler can include openings that allow fluid compositions to be pipetted into the openings and through ports of the fluidic coupler that are engaged with inlets of the flow cell of the sensor device.

For example, a pipette can draw an aliquot of a fluid composition, as illustrated at block 2008. The aliquot can be applied to the openings of the fluidic coupler, as illustrated at block 2010. The aliquot can pass through the opening of the fluidic coupler, through the first set of ports, and through the inlet of the sensor device and into the flow cells of the sensor device.

In an example, the fluid composition can be processed within the flow cell, as illustrated at block 2012. For example, a magnetic loading technique can be applied to load samples within wells of the sensor device.

As illustrated at block 2014, the remainder of the fluid composition can be drawn from the flow cells of the sensor device. For example, a vacuum attached to the manifold pressed against the fluidic coupler and in fluid communication with the outlets of the flow cells can draw the remainder of the fluid composition from the flow cells. The process of pipetting an aliquot of fluid composition, applying the aliquot, processing the fluid composition, and drawing the remainder of the fluid composition can be repeated, for example, to apply additional samples or wash the flow cell.

Once the process of loading is complete, the sensor device can be released from the mechanical assembly, as illustrated at block 2016. For example, the mechanical assembly can be drawn to a rearward position, releasing the sensor device and the fluidic coupler, and permitting the sensor device to move to a subsequent station.

The slide and sensor device can move to a third position, as illustrated at block 2018. For example, sensor device can be moved to a sequencing section of the system.

In an first aspect, an apparatus includes a fluidic coupler including an opening, a first port in fluid communication with the opening and to interface with an inlet of a flow cell of a sensor device, a second port to interface with an outlet of the flow cell of the sensor device, and a third port in fluidic communication with the second port; and a mechanical assembly moveable between a first position and a second position, the fluidic coupler secured to the flow cell of the sensor device in the first position, the fluidic coupler disengaged from the flow cell of the sensor device in the second position.

In an example of the first aspect, the sensor device connects with the fluidic coupler in a vertical orientation.

In another example of the first aspect and the above examples, the fluidic coupler is separable and removeable from the mechanical assembly when the mechanical assembly is in the second position.

In a further example of the first aspect and the above examples, the sensor device is a sequencing chip.

In an additional example of the first aspect and the above examples, the mechanical assembly includes a set of rods to engage reference holes of the fluidic coupler when the mechanical assembly is moved from the first position to the second position. For example, a rod of the set of rods is responsive to a lever. In an example, the apparatus further includes a spring in contact with the lever motivating the lever to move the rod forward.

In another example of the first aspect and the above examples, the mechanical assembly includes a drive mechanism and a frame to move in response to the drive mechanism.

In a further the mechanical assembly includes a clutch connecting the drive mechanism to the frame. For example, the clutch includes a nut and a set of springs and pins coupling the nut to the frame. In an example, when the mechanical assembly is in the first position, the drive mechanism moves the nut of the clutch to apply pressure through the set of springs to the frame to press the first and second ports of the fluidic coupler against the inlet and outlet ports of the flow cell.

In an additional example of the first aspect and the above examples, the mechanical assembly further includes a sensor to detect the mechanical assembly is the first position.

In another example of the first aspect and the above examples, the mechanical assembly further includes a sensor to detect the mechanical assembly is in the second position.

In a further example of the first aspect and the above examples, the apparatus further includes a vacuum system in fluidic communication with the third port when the mechanical assembly is in the first position.

In a second aspect, an apparatus includes a fluidic coupler to engage a plurality of flow cells of a sensor device, the fluidics coupler including a plurality of fluidics interfaces, each fluidic interface of the plurality of fluidics interfaces includes an opening, a first port in fluid communication with the opening, a second port, and a third port in fluidic communication with the second port; and a mechanical assembly to move a frame between a first position and a second position, the frame engaged with the fluidic coupler and securing the fluidic coupler to the sensor device in the first position, the fluidic coupler removeable from the body in the second position.

In an example of the second aspect, the sensor device includes the plurality of flow cells, each flow cell of the plurality of flow cells including an inlet port and an outlet port, the first port of the each fluidic interface to engage the inlet port of the each flow cell, the second port of the each fluidic interface to engage the outlet port of the each flow cell.

In a third aspect, a fluidic coupler includes a body and a plurality of fluidics interfaces formed in the body, each fluidic interface of the plurality of fluidics interfaces includes an opening, a first port in fluid communication with the opening, a second port, and a third port in fluidic communication with the second port.

In an example of the third aspect, the first port and the second port include seals formed of resilient material. For example, the resilient material is an overmold.

In another example of the second aspect and the above examples, the opening is configured to receive fluid from a pipette tip.

In a further example of the second aspect and the above examples, the body defines reference holes to receive guide rods.

In a fourth aspect, a method of applying a fluid composition to a flow cell of a sensor device includes inserting the sensor device into a holder, pipetting an aliquot of the fluid composition into a pipette tip, and applying the aliquot of the fluid composition to an opening of a fluidic connector engaged with the flow cell of the sensor device. The fluidic connector includes a body and a plurality of fluidics interfaces formed in the body, each fluidic interface of the plurality of fluidics interfaces includes an opening, a first port in fluid communication with the opening, a second port, and a third port in fluidic communication with the second port.

In an example of the fourth aspect, the sensor device is disposed in the holder in a vertical orientation.

In another example of the fourth aspect and the above examples, the method further including drawing a remainder of the aliquot of the fluid composition from the third port. For example, drawing the remainder include applying a vacuum to the third port.

In a further example of the fourth aspect and the above examples, the method further including inserting the fluidic coupler into a mechanical assembly when the mechanical assembly is in a first position.

In an additional example of the fourth aspect and the above examples, the method further comprising moving the mechanical assembly to a second position, whereby the fluidic coupler engages the flow cell of the sensor device.

In another example of the fourth aspect and the above examples, the method further comprising moving the holder into position adjacent the mechanical assembly.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A fluidic coupler to engage a plurality of flow cells of a sensor device, the fluidic coupler comprising:
   a body; and
   a plurality of fluidics interfaces formed in the body, each fluidic interface of the plurality of fluidics interfaces includes an opening, a first port in fluid communication with the opening, a second port, and a third port in fluidic communication with the second port.

2. The fluidic coupler of claim 1, wherein the first port and the second port include seals formed of resilient material.

3. The fluidic coupler of claim 2, wherein the resilient material is an overmold.

4. The fluidic coupler of claim 1, wherein the opening is configured to receive fluid from a pipette tip.

5. The fluidic coupler of claim 1, wherein the body forms reference holes to receive guide rods.

6. The fluidic coupler of claim 5, wherein the body includes wings and the reference holes are formed in the wings.

7. The fluidic coupler of claim 1, wherein the opening is disposed at a top of the fluidic coupler.

8. The fluidic coupler of claim 7, wherein the first and second port are disposed on a first side of the fluidic coupler.

9. The fluidic coupler of claim 8, wherein the third port is disposed on a second side of the fluidic coupler opposite the first side.

10. The fluidic coupler of claim 1, further comprising a fourth port in fluid communication with the first port.

11. The fluidic coupler of claim 10, wherein the first port is disposed on a first side of the fluidic coupler and the fourth port is disposed on a second side of the fluidic coupler opposite the first side.

12. The fluidic coupler of claim 8, wherein the first side is perpendicular to the top of the body.

13. The fluidic coupler of claim 7, wherein the top is a horizontal surface.

14. The fluidic coupler of claim 8, wherein the top is a horizontal surface and the first side is a vertical surface.

15. The fluidic coupler of claim 1, wherein the first port has a first port opening different from the opening.

16. The fluidic coupler of claim 1, wherein the first, second, and third ports have port openings different from the opening.

17. The fluidic coupler of claim 1, wherein the first, second and third ports are disposed on sides of the body different than the opening.

18. The fluidic coupler of claim 1, the first and second ports are disposed on the same side.

19. The fluidic coupler of claim 1, the first and second ports are configured to engage a flow cell of the plurality of flow cells.

20. The fluidic coupler of claim 1, wherein the plurality of fluidics interfaces includes four fluidics interfaces.

* * * * *